(12) United States Patent
Kusaka et al.

(10) Patent No.: US 9,857,533 B2
(45) Date of Patent: Jan. 2, 2018

(54) OPTICAL WAVEGUIDE ELEMENT, LIGHT-RECEIVING DEVICE, OPTICAL COMMUNICATION DEVICE, OPTICAL MODULATOR, OPTICAL RESONATOR, AND METHOD FOR MANUFACTURING OPTICAL WAVEGUIDE ELEMENT

(71) Applicant: FUJIKURA LTD., Tokyo (JP)

(72) Inventors: Hiroyuki Kusaka, Tokyo (JP); Ryokichi Matsumoto, Sakura (JP); Kazuhiro Goi, Sakura (JP); Kensuke Ogawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/450,942

(22) Filed: Mar. 6, 2017

(65) Prior Publication Data
US 2017/0176681 A1    Jun. 22, 2017

Related U.S. Application Data

(63) Continuation of application No. PCT/JP2015/081091, filed on Nov. 4, 2015.

(30) Foreign Application Priority Data

Dec. 15, 2014 (JP) ................ 2014-253065

(51) Int. Cl.
*G02F 1/035* (2006.01)
*G02B 6/126* (2006.01)
(Continued)

(52) U.S. Cl.
CPC ......... *G02B 6/126* (2013.01); *G02B 6/12004* (2013.01); *G02B 6/125* (2013.01);
(Continued)

(58) Field of Classification Search
CPC .... G02B 6/126; G02B 6/278; G02B 6/12004; G02B 6/1228; G02B 6/125; G02B 2006/12123; G02F 1/225; G02F 2001/212
See application file for complete search history.

(56) References Cited

U.S. PATENT DOCUMENTS 5,511,142 A   4/1996  Horie et al.
5,694,496 A  12/1997  Ando et al.
(Continued)

FOREIGN PATENT DOCUMENTS

JP   4-241304 A   8/1992
JP   7-92326 A    4/1995
(Continued)

OTHER PUBLICATIONS

Goi et al., "Low-Loss Silicon Partial-Rib Waveguide Polarization Rotator", 18th Microoptics Conference (MOC'13),The Japan Society of Applied Physics, Tokyo, Japan, 2 pages, Oct. 27-30, 2013.
(Continued)

*Primary Examiner* — Ellen Kim
(74) *Attorney, Agent, or Firm* — Westerman, Hattori, Daniels & Adrian, LLP

(57) ABSTRACT

An optical waveguide element includes a core and a cladding that is made of $SiO_2$. When $n_{g\_i\_TE}$ is a group refractive index of a TE0 polarized wave in the i-th waveguide counted from a light incidence plane of the core and $n_{g\_i\_TM}$ is a group refractive index of a TM0 polarized wave in the i-th waveguide, the length $L_i$[m] of the i-th waveguide satisfies a predetermined relation.

14 Claims, 12 Drawing Sheets

(51) Int. Cl.
  *G02B 6/125* (2006.01)
  *G02B 6/122* (2006.01)
  *G02B 6/12* (2006.01)
  *G02F 1/225* (2006.01)
  *G02B 6/27* (2006.01)
  *G02F 1/21* (2006.01)

(52) U.S. Cl.
  CPC ........... *G02B 6/1228* (2013.01); *G02B 6/278* (2013.01); *G02F 1/225* (2013.01); *G02B 2006/12123* (2013.01); *G02F 2001/212* (2013.01)

(56) References Cited

U.S. PATENT DOCUMENTS

2010/0322559 A1  12/2010  Ogawa et al.
2011/0116741 A1   5/2011  Cevini et al.
2017/0068048 A1*  3/2017  Kamei .................. G02B 6/126

FOREIGN PATENT DOCUMENTS

JP    2011-48016 A    3/2011
WO   2009/107811 A1   9/2009

OTHER PUBLICATIONS

Japanese Office Action dated Jan. 19, 2016, issued in counterpart Japanese Patent Application No. 2014-253065 (3 pages).
Japanese Notice of Allowance (NOA) dated Aug. 9, 2016, issued in counterpart Japanese Patent Application No. 2014-253065 (2 pages).
International Search Report dated Jan. 19, 2017 issued in PCT/JP2015/081091.

\* cited by examiner

OPTICAL WAVEGUIDE ELEMENT, LIGHT-RECEIVING DEVICE, OPTICAL COMMUNICATION DEVICE, OPTICAL MODULATOR, OPTICAL RESONATOR, AND METHOD FOR MANUFACTURING OPTICAL WAVEGUIDE ELEMENT

CROSS-REFERENCE TO RELATED APPLICATIONS

This application is a Continuation of PCT International Application No. PCT/JP2015/081091 filed in Japan on Nov. 4, 2015, which claims the benefit of Patent Application No. 2014-253065 filed in Japan on Dec. 15, 2014, the entire contents of which are hereby incorporated by reference.

TECHNICAL FIELD

The present invention relates to an optical waveguide for guiding light, more specifically, to an optical waveguide made of silicon-based materials.

BACKGROUND ART

In recent years, a silicon optical waveguide element including a core made of silicon (Si) and a cladding made of silica ($SiO_2$) has been drawing attention. As compared to an optical waveguide including a core made of silica, the silicon optical waveguide element has an advantage that the size of an optical waveguide can be reduced because the silicon optical waveguide element has a large refractive index difference between the core and the cladding. Further, it is possible to employ, as a production process for the silicon optical waveguide element, a production process for producing a silicon large-scale integrated circuit. Thus, the silicon optical waveguide element has another advantage that production cost can be suppressed.

The silicon optical waveguide element is fabricated by using an SOI (Silicon On Insulator) substrate. More specifically, the silicon optical waveguide element is fabricated by: first forming a silicon waveguide by patterning of an Si layer of an SOI substrate by use of a lithographic technique; and then forming a silica oxide film on the silicon wave guide.

In SOI substrates, the thickness of an Si layer is often set to 220 nm. As described above, the core is formed by patterning of an Si layer of an SOI substrate. Therefore, the waveguide which serves as the core of the silicon optical waveguide element often has a thickness of 220 nm.

Further, in such a silicon optical waveguide element, the width of a waveguide is often within a range of not less than 450 nm and not more than 500 nm. In a case where the width of the waveguide is set to less than 450 nm, a side wall(s) of the waveguide tends to be rough due to a technical limitation in a lithography process. Further, in a case where the width of the waveguide is set to less than 450 nm, light leaks more out of the waveguide as the width of the waveguide is decreased. When light that largely leaks out of the waveguide propagates through the waveguide, light loss increases significantly due to roughness of the wave guide. In other words, the roughness of the side wall(s) of the waveguide significantly increases light loss of the waveguide. On the other hand, in a case where the width of the waveguide is set to larger than 500 nm, a polarization mode of light propagating through the waveguide changes with a higher probability to another polarization mode. This becomes another factor that increases light loss of the waveguide.

As described above, the length in a vertical direction (thickness direction) of the waveguide in the silicon optical waveguide element often differs from the length in a transverse direction (width direction) of the waveguide. In other words, the waveguide of the silicon optical waveguide element has a cross-sectional shape that is anisotropic between the vertical direction and the transverse direction. In the case of such an anisotropic waveguide, there occurs a difference in group refractive index between two polarization modes of light propagating through the waveguide which two polarization modes have respective electric fields oscillating in different directions, respectively. In other words, group refractive indexes of light propagating through such an anisotropic waveguide are polarization-dependent. The two polarization modes having respective electric fields oscillating in different directions, respectively, are, for example, a TE0 mode and a TM0 mode.

Further, the silicon optical waveguide element has a feature that a relative refractive index difference between the core and the cladding is large. The silicon optical waveguide element has that feature because the core is made of silicon while the cladding is made of silica. Since the relative refractive index difference between the core and the cladding is large, the group refractive index difference of light propagating through such an anisotropic waveguide becomes larger. This results in more evident polarization dependency of the group refractive index.

The group refractive index exhibits polarization dependency, because as described above, the waveguide has different lengths in the vertical direction and in the transverse direction, respectively. Accordingly, such polarization dependency is exhibited by a waveguide that is not a silicon optical waveguide element. However, since the silicon optical waveguide element has a very large refractive index difference between silicon of which the core is made and silica of which the cladding is made, the group refractive index difference between the TE0 mode and the TM0 mode becomes very large. This results in more evident polarization dependency of the group refractive index.

When an optical signal of a TE0 mode and an optical signal of a TM0 mode are propagated from one end to the other end of a waveguide in which the group refractive index of the TE0 mode is different from the group refractive index of the TM0 mode, the time of arrival at the other end is different between the TM0 mode and the TE0 mode. The occurrence of such difference in the time of arrival is known as polarization mode dispersion, and becomes a cause of deterioration in signal characteristics of an optical signal.

For example, in a case where a waveguide has a thickness of 220 nm and a width of 500 nm, the group refractive index of a TE0 mode is 4.23 and the group refractive index of a TM0 mode is 3.87. Therefore, the group refractive index difference between the TE0 mode and the TM0 mode is 0.36. This group refractive index difference causes a difference of 6 picoseconds in the time of arrival between the TE0 mode and the TM0 mode in propagation of the TE0 mode and the TM0 mode through a waveguide having a length of 5 mm. This difference of 6 picoseconds corresponds to 0.06 UI (Unit Interval) of a 10 Gbps modulated signal, and to 0.18 UI of a 30 Gbps modulated signal. Such a difference in the time of arrival increases a jitter component of an optical signal, and consequently leads to deterioration in signal characteristics.

As a technique for compensating the above-described polarization mode dispersion, Patent Literatures 1 and 2 each disclose a technique according to which a polarization rotation element is provided at a middle point of a silicon optical waveguide element. The polarization rotation element rotates a polarization plane of incident light so as to convert a TE0 mode to a TM0 mode and a TM0 mode to a TE0 mode. Patent Literature 1 uses, as the polarization rotation element, a λ/2 plate made of a crystal plate. On the other hand, Patent Literature 2 uses, as the polarization rotation element, a λ/2 plate made of a polyimide thin film.

Further, Non-patent Literature 1 discloses a polarization rotation element partially including a rib structure, as a polarization rotation element for rotating a polarization mode in silicon.

CITATION LIST

Patent Literatures

[Patent Literature 1] Japanese Patent Application Publication, Tokukaihei, No. 4-241304 (Publication date: Aug. 28, 1992)
[Patent Literature 2] Japanese Patent Application Publication, Tokukaihei, No. 7-92326 (Publication date: Apr. 5, 1995)

Non-Patent Literature

[Non-patent Literature 1] Kazuhiro Goi et. al., "18th Microoptics Conference technical digest", F6, 2013

SUMMARY OF INVENTION

Technical Problem

However, a very complex process is required for providing a λ/2 plate made of a crystal plate or a polyimide thin film, in a silicon optical waveguide element. Accordingly, respective silicon optical waveguide elements disclosed in Patent Literatures 1 and 2 each had a problem that production cost reduction is difficult.

Further, in a polarization rotation element partially including a rib structure, high loss occurs in polarization conversion. Therefore, the silicon optical waveguide element disclosed in Patent Literature 1 had a problem that reduction of waveguide loss is difficult.

In view of the above, a technique that can compensate polarization mode dispersion in a silicon optical waveguide element has been demanded as a replacement for the polarization rotation element.

An embodiment of the present invention is attained in view of the above problems. An object of the present invention is to provide a low-loss optical waveguide element capable of compensating polarization mode dispersion, at a production cost lower than that of a conventional optical waveguide element.

Solution to Problem

In order to solve the above problems, an optical waveguide element in accordance with an aspect of the present invention, includes: a core made of Si, the core including a plurality of waveguides having different widths, respectively, the plurality of waveguides communicating with each other along a light propagation direction; and a cladding made of $SiO_2$, when an i-th waveguide of the plurality of waveguides, as counted from a light incidence plane of the core, has a length L_i[m], the length L_i[m] satisfying the following relation:

[Math. 1]

$$\left|\sum_i L_i(n_{g\_i\_TE} - n_{g\_i\_TM})\right| \leq 1.5 \times 10^{-3} [m],$$

where $n_{g\_i\_TE}$ is a group refractive index of a TE0 polarized wave in the i-th waveguide, and $n_{g\_i\_TM}$ is a group refractive index of a TM0 polarized wave in the i-th waveguide.

With the above configuration, respective polarization dispersions in the plurality of waveguides having different widths, respectively, are compensated with each other, Therefore, the optical waveguide element in accordance with an aspect of the present invention is an optical waveguide element capable of compensating polarization mode dispersion.

Further, unlike respective optical waveguide elements disclosed in Patent Literatures 1 and 2 and Non-patent Literature 1, the optical waveguide element in accordance with an aspect of the present invention requires no provision of a polarization rotation element inside the optical waveguide element. This makes it possible to employ a production process of a silicon large-scale integrated circuit, as a production process of the optical waveguide element. Further, light loss cannot occur due to a polarization rotation element in the optical waveguide element. Therefore, the optical waveguide element in accordance with an aspect of the present invention is also a low-loss optical waveguide element that can be produced at a low production cost, as compared to the respective optical waveguide elements disclosed in Patent Literatures 1 and 2 and Non-patent Literature 1.

An optical modulator in accordance with an aspect of the present invention includes: a core made of Si and including a Mach-Zehnder interferometer, the core having a first arm and a second arm; and a cladding made of $SiO_2$, the core including a waveguide set which produces a difference between the first arm and the second arm of the core, the waveguide including an optical waveguide element in accordance with an aspect of the present invention.

With the above configuration, in the core including a Mach-Zehnder interferometer, the waveguide set which produces a difference between the first arm and the second arm includes at least two waveguides which have different widths, respectively, and communicate with each other. Further, polarization mode dispersions in the waveguide set that produces the difference are compensated by the at least two waveguides having different widths, respectively. Therefore, the optical modulator in accordance with an aspect of the present invention is an optical modulator capable of compensating polarization mode dispersion. In other words, the optical modulator in accordance with an aspect of the present invention can equalize, to a level that causes no practical problem, wavelengths at each of which light is mutually enhanced, even in a case where polarization modes of polarized waves of the light are different from each other.

Further, the optical modulator in accordance with an aspect of the present invention, like the optical waveguide element in accordance with an aspect of the present invention, is a low-loss optical modulator that can be produced at a low production cost.

An optical resonator in accordance with an aspect of the present invention includes: a first core that is a ring-shaped core made of Si; a second core made of Si, the second core being coupled to the first core so as to resonate with the first core; and a cladding made of $SiO_2$, the first core including a core of an optical waveguide element in accordance with an aspect of the present invention.

With the above configuration, polarization mode dispersion in the first core having a ring shape is compensated. Therefore, the optical resonator in accordance with an aspect of the present invention can dissolve polarization dependency of a resonant wavelength.

Further, the optical resonator in accordance with an aspect of the present invention, like the optical waveguide element in accordance with an aspect of the present invention, is a low-loss optical resonator that can be produced at a low production cost.

A method in accordance with an aspect of the present invention for producing an optical waveguide element including: a core made of Si, the core including a plurality of waveguides having different widths, respectively, the plurality of waveguides communicating with each other along a light propagation direction; and a cladding made of $SiO_2$, the method comprising the step of: setting a length $L_{\_i}[m]$ of an i-th waveguide, as counted from a light incidence plane of the core, such that the length $L_{\_i}[m]$ satisfies the following relation:

[Math. 5]
$$\left|\sum_i L_i(n_{g\_i\_TE} - n_{g\_i\_TM})\right| \leq 1.5 \times 10^{-3} [m],$$

where $n_{g\_i\_TE}$ is a group refractive index of a TE0 polarized wave in the i-th waveguide, and $n_{g\_i\_TM}$ is a group refractive index of a TM0 polarized wave in the i-th, waveguide.

An optical waveguide element in accordance with an aspect of the present invention includes: a core made of Si, the core including a plurality of waveguides having different widths, respectively, the plurality of waveguides communicating with each other along a light propagation direction; and a cladding made of $SiO_2$, the core including a first waveguide and a second waveguide, the first waveguide having a width which leads to a group refractive index difference having a positive value, the second waveguide having a width which leads to a group refractive index difference having a negative value, the group refractive index difference being a difference between a group refractive index of a TE0 polarized wave and a group refractive index of a TM0 polarized wave.

With the above configuration, the optical waveguide element and the production method thereof each yield an effect similar to that of the optical waveguide element in accordance with an aspect of the present invention.

Advantageous Effects of Invention

The present invention makes it possible to provide a low-loss optical waveguide element capable of compensating polarization mode dispersion, at a production cost lower than that of a conventional optical waveguide element.

BRIEF DESCRIPTION OF DRAWINGS (a) of FIG. 1 is a top view of an optical waveguide element in accordance with Embodiment 1 of the present invention. (b) of FIG. 1 is a cross-sectional view of the optical waveguide element taken along line A-A shown in (a) of FIG. 1. (c) of FIG. 1 is a cross-sectional view of the optical waveguide element taken along line B-B shown in (a) of FIG. 1.

Figure 6:
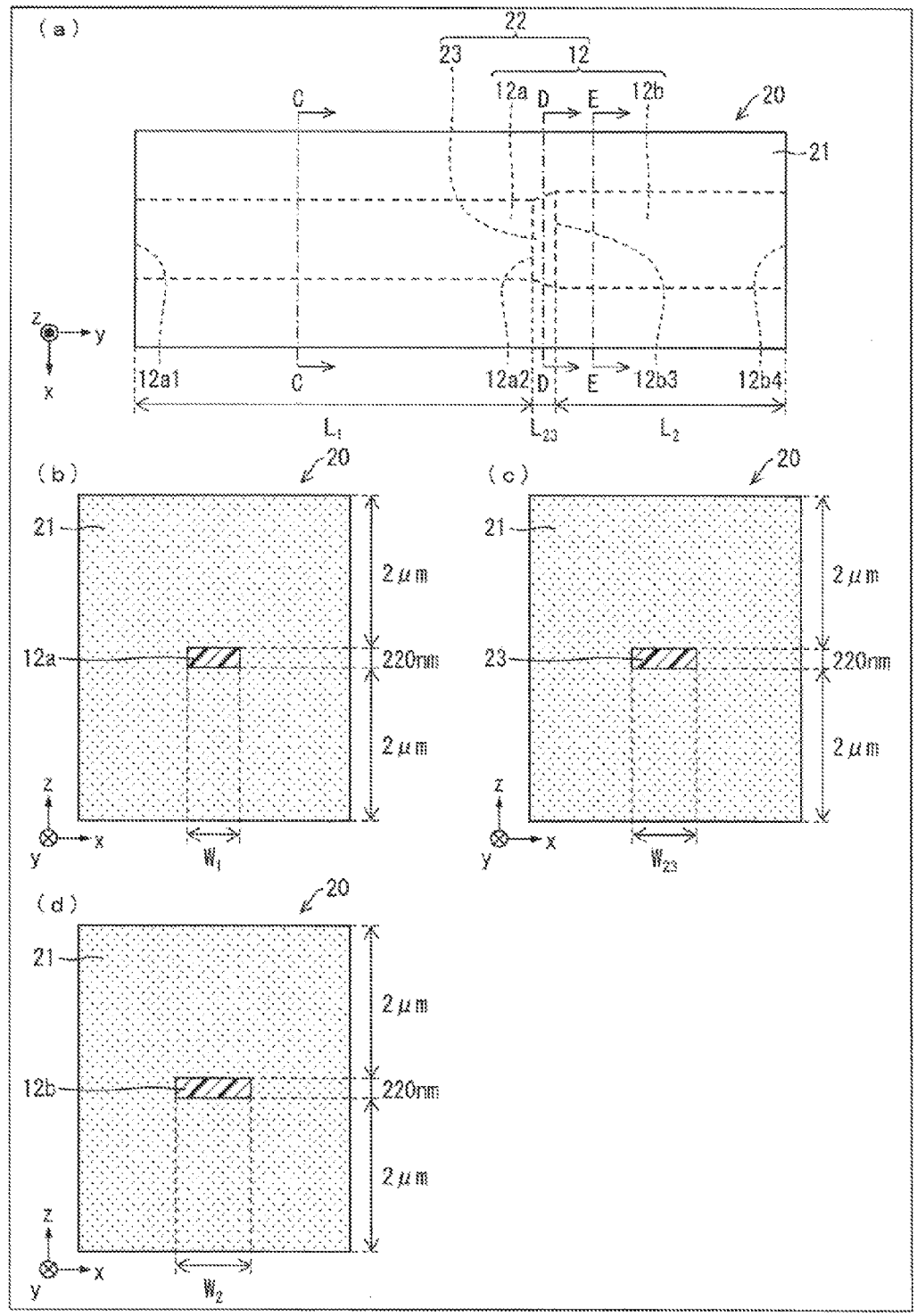

(a) of FIG. 6 is a top view of an optical waveguide element in accordance with Embodiment 2 of the present invention. (b) of FIG. 6 is a cross-sectional view of the optical waveguide element taken along line C-C shown in (a) of FIG. 6. (c) of FIG. 6 is a cross-sectional view of the optical waveguide element taken along line D-D shown in (a) of FIG. 6. (d) of FIG. 6 is a cross-sectional view of the optical waveguide element taken along line E-E shown in (a) of FIG. 6.

Figure 7:
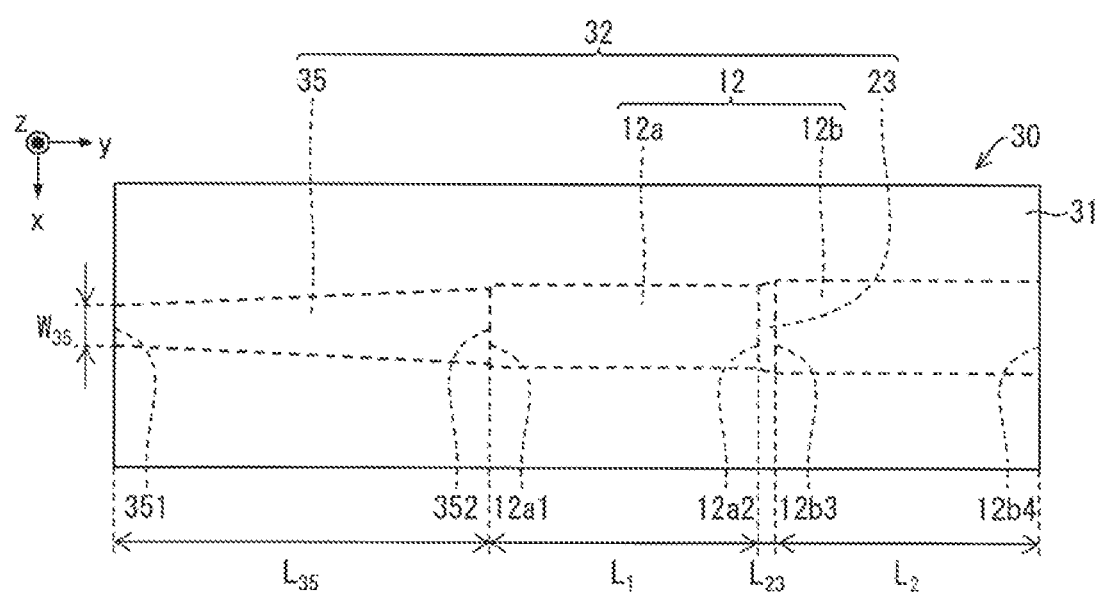

FIG. 7 is a top view of an optical waveguide element in accordance with Embodiment 3 of the present invention.

Figure 8:
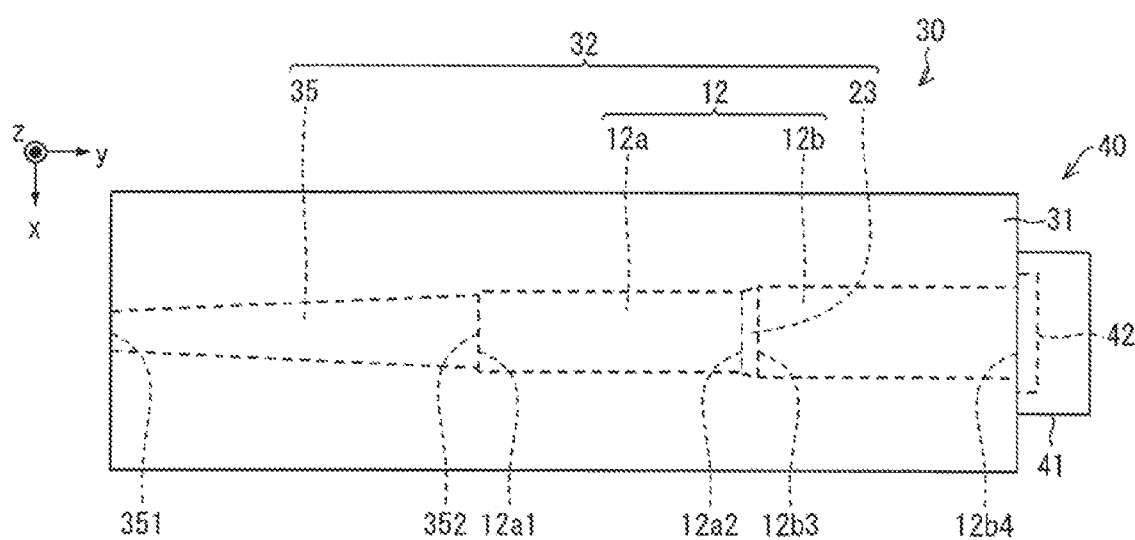

FIG. 8 is a top view of a light-receiving element in accordance with Embodiment 4 of the present invention.

Figure 9:
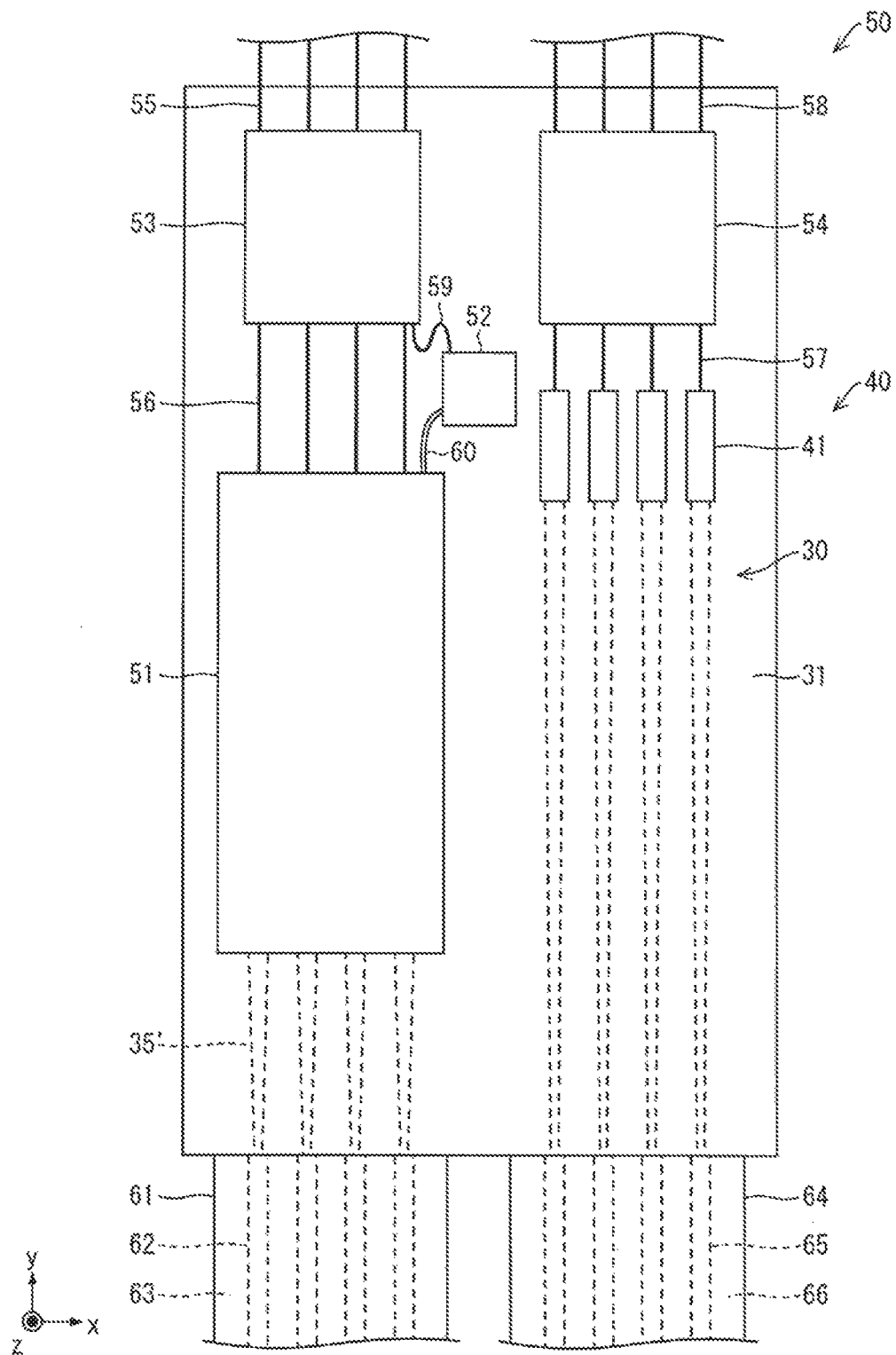

FIG. 9 is a top view of an optical communication device in accordance with Embodiment 5 of the present invention.

Figure 10:
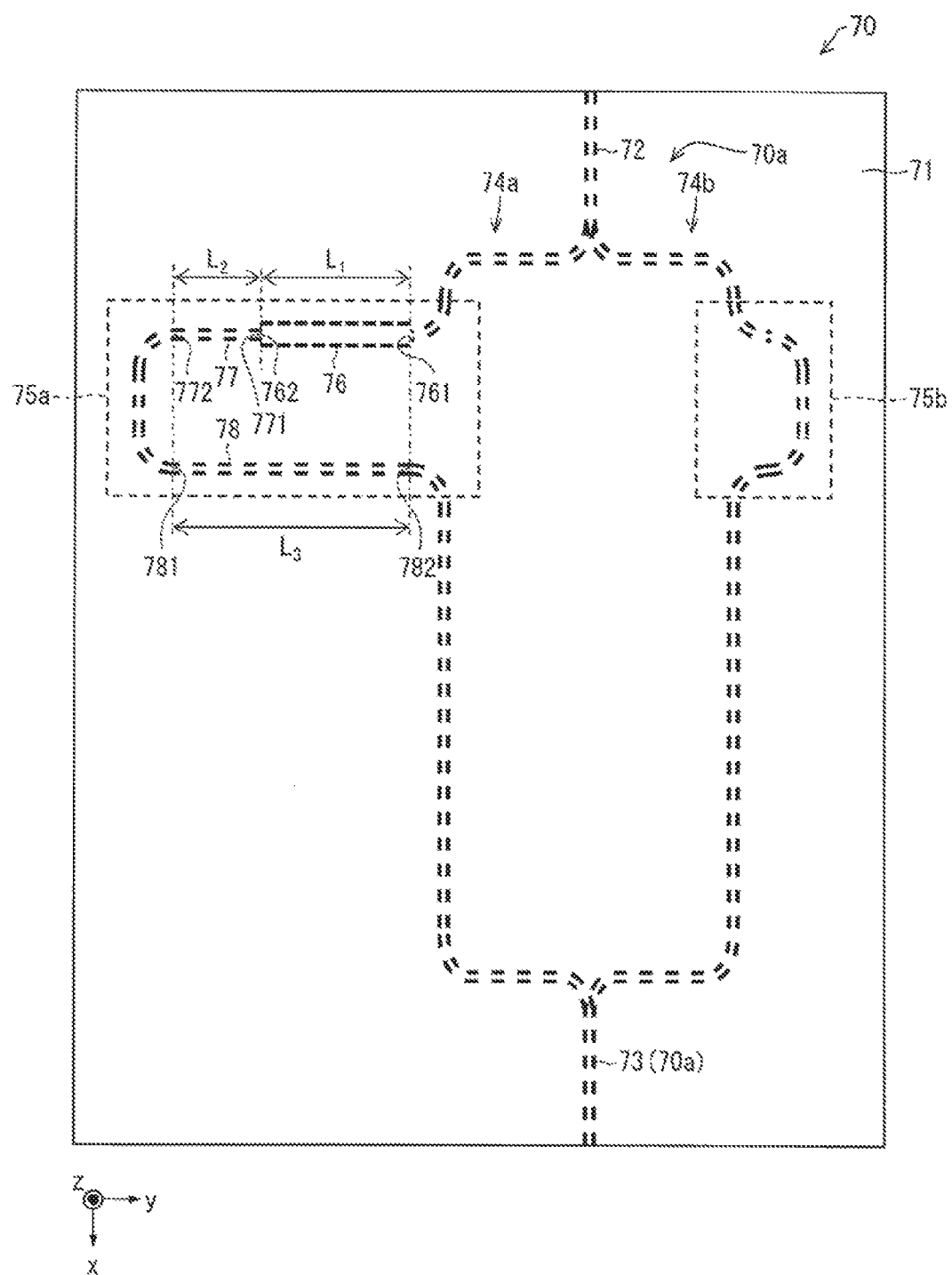

FIG. 10 is a top view of an optical modulator in accordance with Embodiment 6 of the present invention.

Figure 11:
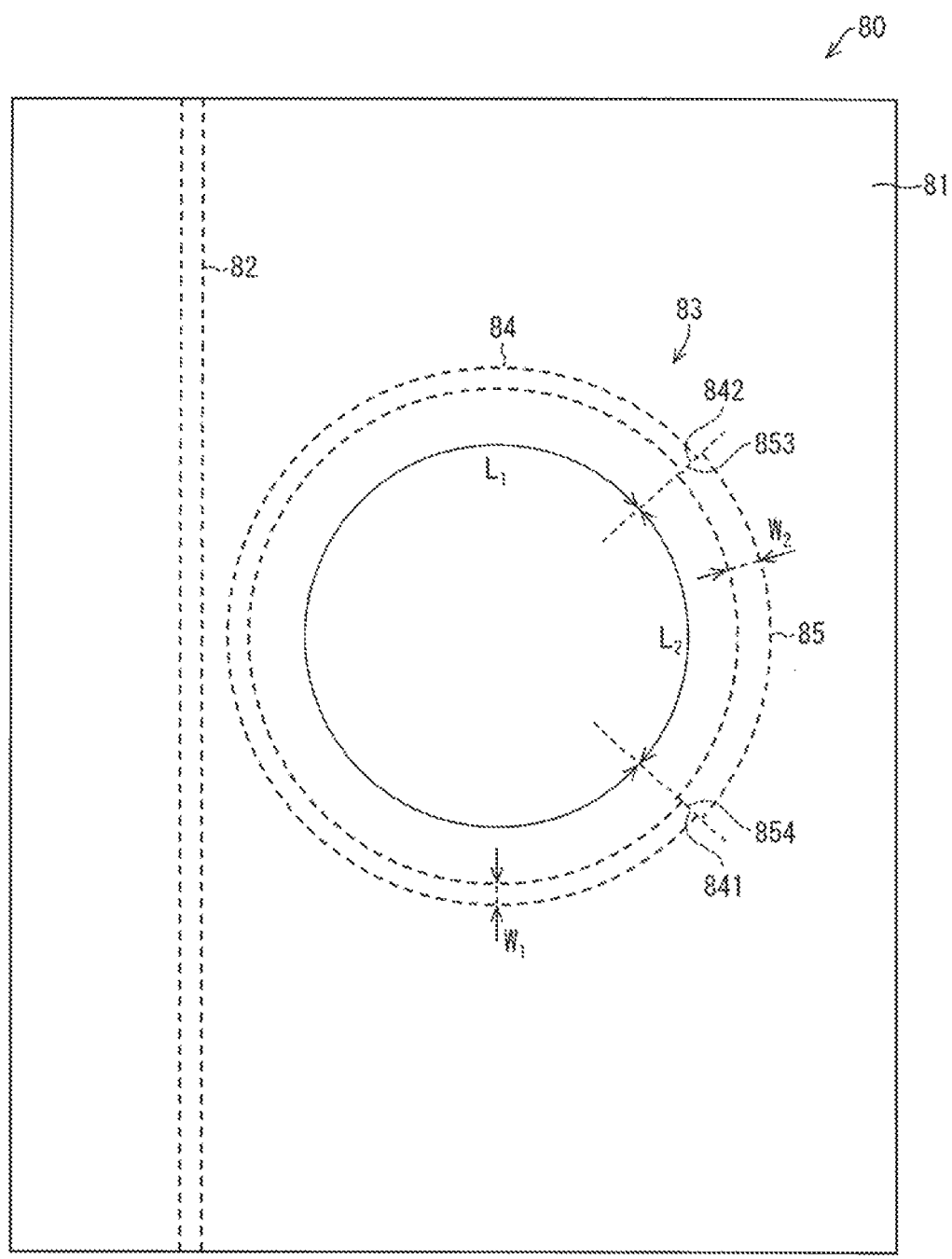

FIG. 11 is a top view of an optical resonator in accordance with Embodiment 7 of the present invention.

Figure 12:
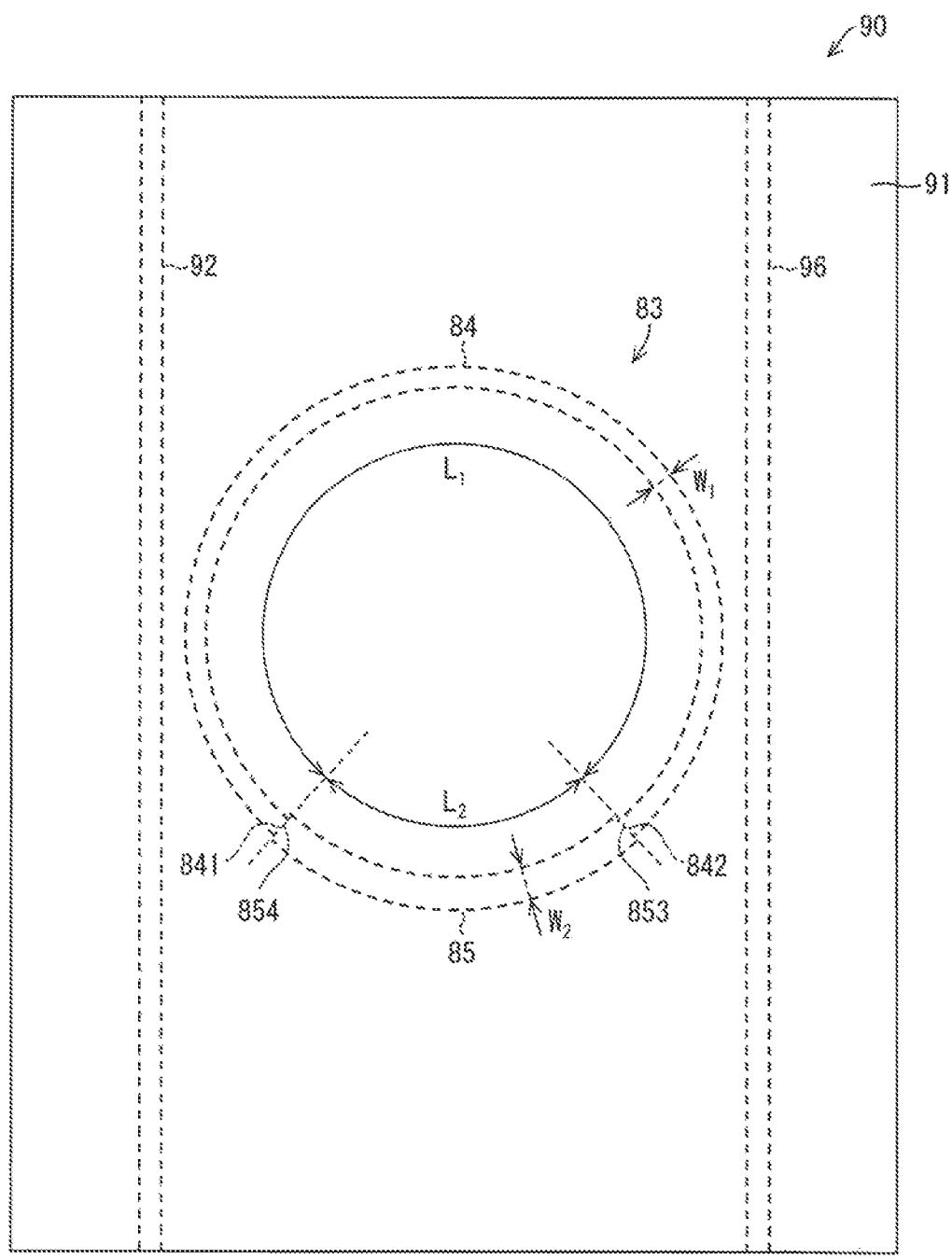

FIG. 12 is a top view of another optical resonator in accordance with Embodiment 7 of the present invention.

DESCRIPTION OF EMBODIMENTS

[Embodiment 1]

Figure 1:
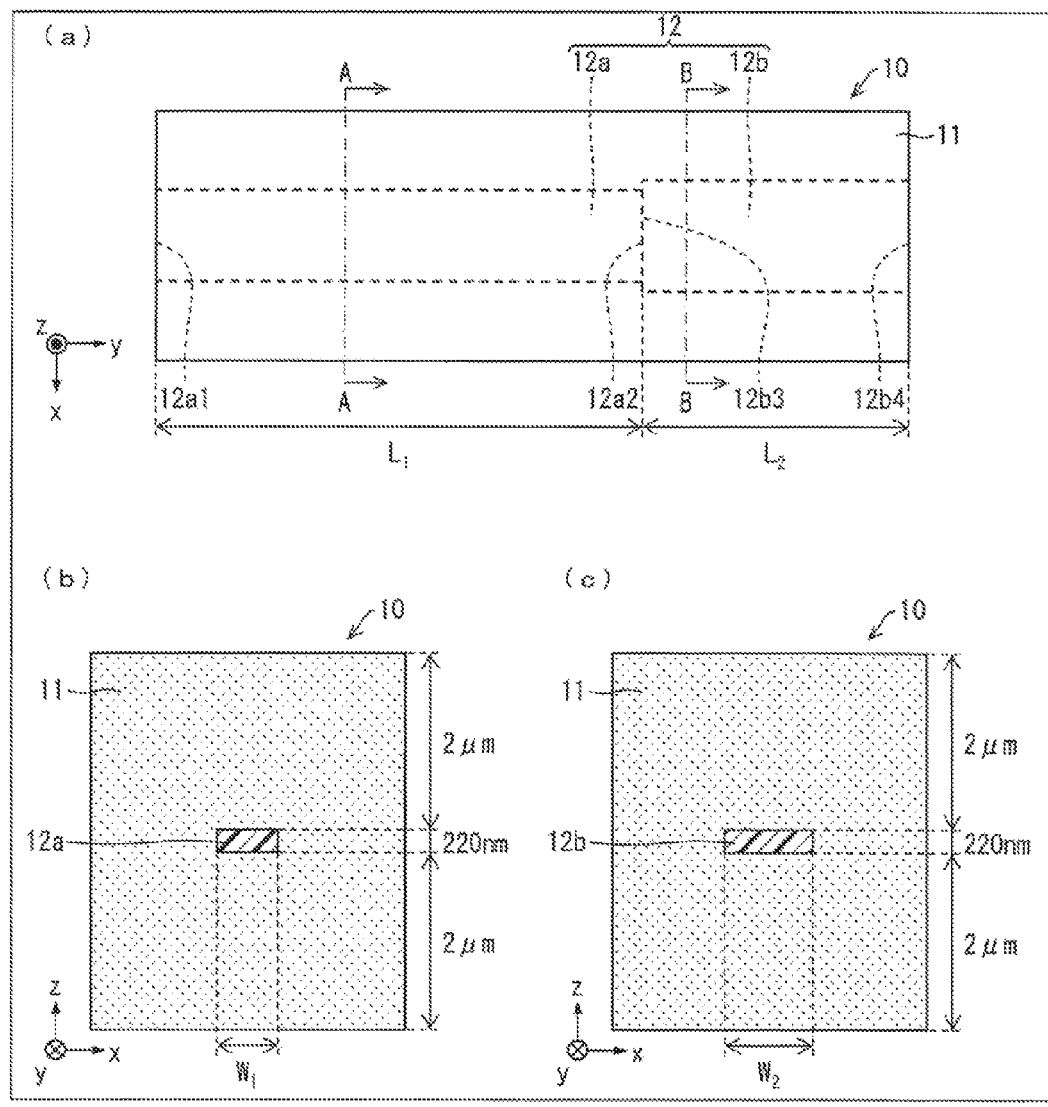

The following description will discuss an optical waveguide element in accordance with Embodiment 1 of the present invention, with reference to FIG. 1. (a) of FIG. 1 is a top view of an optical waveguide element 10 in accordance with Embodiment 1. (b) of FIG. 1 is a cross-sectional view of the optical waveguide element 10 taken along line A-A shown in (a) of FIG. 1. (c) of FIG. 1 is a cross-sectional view of the optical waveguide element 10 taken along line B-B shown in (a) of FIG. 1.

(Overview of Optical Waveguide Element 10)

The optical waveguide element 10 is an optical waveguide element for propagating optical signals for use in optical communications, more specifically, propagating optical signals each having a wavelength in the vicinity of 1.55 μm.

The optical waveguide element 10 is a silicon optical waveguide element, which is fabricated by using an SOI (Silicon On Insulator) substrate and includes a cladding 11 made of silica ($SiO_2$) and a core 12 made of silicon (Si). As illustrated in FIG. 1, the core 12 made of Si is a core in which a plurality of wave guides having different widths, respectively, communicates with one another along a light propagation direction. The core 12 includes, for example, a first waveguide 12a and a second waveguide 12b.

The first waveguide 12a and the second waveguide 12b are each formed by patterning of an Si layer of an SOI substrate by use of a lithographic technique. Currently, most SOI substrates available on the market are manufactured such that the thickness of an Si layer is 220 nm. If a production tolerance is ±10 nm in manufacturing SOI substrates, it can be said that most SOI substrates available on the market include an Si layer having a thickness in a range of not less than 210 nm and not more than 230 nm. Then, the first waveguide 12a and the second waveguide 12b formed by patterning of such an Si layer each have a thickness in a range of not less than 210 nm and not more than 230 nm.

On the premise of the above, the following description assumes that the first waveguide 12a and the second waveguide 12b each have a thickness in a range of not less than 210 nm and not more than 230 nm, and when nothing is mentioned specifically on a production tolerance since consideration on a production tolerance is unnecessary, the thickness is 220 nm (see (b) and (c) of FIG. 1).

The first waveguide 12a and the second waveguide 12b each made of Si and formed on an SiO$_2$ layer of an SOI substrate are sealed with an SiO$_2$ oxide film which is deposited on the SiO$_2$ layer. The SiO$_2$ layer of the SOI substrate functions as a lower cladding, and the SiO$_2$ oxide film formed on the SiO$_2$ layer functions as an upper cladding. Hereinafter, the upper cladding and the lower cladding are not distinguished from each other but are referred to simply as "cladding 11".

(Configuration of Core 12)

Next, the following description will discuss the first waveguide 12a and the second waveguide 12b constituting the core 12 of the optical waveguide element 10, with reference to (a) to (c) of FIG. 1.

First, the following defines a coordinate system shown in FIG. 1. (1) A y axis is an axis parallel to a direction in which the first waveguide 12a is arranged to extend. The orientation of the y axis is defined such that a positive direction is a direction from the first waveguide 12a toward the second waveguide 12b (light propagation direction). (2) A z axis is an axis parallel to a thickness direction of the first waveguide 12a. The orientation of the z axis is defined such that a positive direction is a direction from the first waveguide 12a toward a surface of the cladding 11. (3) An x axis is an axis parallel to a width direction of the first waveguide 12a. The orientation of the x axis is defined such that the x axis constitutes a right-handed system together with the y axis and the z axis which are described above.

The first waveguide 12a is a waveguide made of Si. More specifically, the first waveguide 12a is a rectangular waveguide which has a rectangular cross sectional shape along line A-A shown in (a) of FIG. 1. The first waveguide 12a is provided inside the cladding 11 such that a central axis of this waveguide is parallel to the y axis in the coordinate system shown in FIG. 1.

The thickness (the length in the z axis direction) of the first waveguide 12a is 220 nm as illustrated in (b) of FIG. 1. In the following description, a width (the length in the x axis direction) of the first waveguide 12a is defined as $W_1$, and a length (the length in the y axis direction) of the first waveguide 12a is defined as $L_1$. Embodiment 1 describes a case where the width $W_1$ is 600 nm, as an example of the first waveguide 12a. A specific numerical value of the length $L_1$ will be described later when conditions to be satisfied are discussed.

The second waveguide 12b is a waveguide made of Si. More specifically, the second waveguide 12b is a rectangular waveguide which has a rectangular cross sectional shape along line B-B shown in (a) of FIG. 1. The second waveguide 12b is provided inside the cladding 11 such that a central axis of this waveguide is parallel to the y axis in the coordinate system shown in FIG. 1.

The thickness (the length in the z axis direction) of the second waveguide 12b is 220 nm, as illustrated in (c) of FIG. 1. In the following description, a width (the length in the x axis direction) of the second waveguide 12b is defined as $W_2$, and a length (the length in the y axis direction) of the second waveguide 12b is defined as $L_2$. Embodiment 1 describes a case where the width $W_2$ is 800 nm, as an example of the second waveguide 12b. A specific numerical value of the length $L_2$ will be described later when conditions to be satisfied are discussed.

In the present specification, among six faces constituting the first waveguide 12a, two faces parallel to a zx plane are defined as follows: one of the two faces that is positioned on a negative side relative to the other face in the y axis direction is referred to as a first edge face 12a1; and the other one of the two faces that is positioned on a positive side relative to the one face in the y axis direction is referred to as a second edge face 12a2. Similarly, among six faces constituting the second waveguide 12b, two faces parallel to the zx plane are defined as follows: one of the two faces that is positioned on a negative side relative to the other face in the y axis direction is referred to as a third edge face 12b3; and the other one of the two faces that is positioned on a positive side relative to the one face in the y axis direction is referred to as a fourth edge face 12b4.

As illustrated in (a) of FIG. 1, the first waveguide 12a and the second waveguide 12b are directly connected to each other. In other words, the first waveguide 12a and the second waveguide 12b communicate with each other via the second edge face 12a2 and the third edge face 12b3. The core 12 is made of the first waveguide 12a and the second waveguide 12b which communicate with each other along the light propagation direction. Note that the first waveguide 12a and the second waveguide 12b are preferably provided such that the central axis of the first waveguide 12a is aligned with the central axis of the second waveguide 12b.

In the core 12, the light propagation direction is not limited. In Embodiment 1, light is assumed to enter through the first edge face 12a1, propagate in the positive direction of the y axis through the core 12, and exit through the fourth edge face 12b4. However, the light can enter through the fourth edge face 12b4, propagate in a negative direction of the y axis through the core 12, and exit through the first edge face 12a1. The first edge face 12a1 here is also referred to as a light incidence plane 12a1, while the fourth edge face 12b4 herein is also referred to as a light exit plane 12b4. Note that a first waveguide as counted from the light incidence plane 12a1 is the first waveguide 12a, and a second waveguide as counted from the light incidence plane 12a1 is the second waveguide 12b.

(Group Refractive Index of Light Propagating Through Core 12)

Next, the following discusses a group refractive index of light propagating through the first waveguide 12a and the second waveguide 12b. In a case where light propagates through a waveguide which has a cross section whose vertical length (thickness) and transverse length (width) are unequal to each other, that is, in a case where light propagates through a rectangular waveguide which has a rectangular cross-sectional shape, a group refractive index for a TE polarized wave is different from a group refractive index for a TM polarized wave.

In the following description, the mode numbers N are given to modes of each of the TE polarized wave and the TM polarized wave such that N=0, 1, 2, . . . in the descending order of respective effective refractive indexes (from the highest effective refractive index to the lowest effective refractive index) of the modes of each of the TE polarized wave and the TM polarized wave. Further, a mode corresponding to the mode number N is referred to as an N-order mode. Further, the 0-order mode of the TE0 polarized wave is referred to as a TE0 mode, and the 0-order mode of the TM0 polarized wave is referred to as a TM0 mode. Similarly, higher-order modes (N=1, 2, . . . ) are referred to as, for example, a TE1 mode, a TE2 mode, . . . in the case of the TE polarized wave.

Here, a group refractive index for light of the TE0 mode (TE0 polarized wave) in the i-th waveguide as counted from the light incidence plane 12a1 is defined as $n_{g\_i\_TE}$, and a group refractive index for light of the TM0 mode (TM0 polarized wave) in this i-th waveguide is defined as $n_{g\_i\_TM}$. Accordingly, $n_{g\_1\_TE}$ represents a group refractive index for the TE0 polarized wave in the first waveguide 12a that is the first waveguide as counted from the light incidence plane 12a1, and $n_{g\_1\_TM}$ represents a group refractive index for the TM0 polarized wave in the first waveguide 12a. Further, $n_{g\_2\_TE}$ represents a group refractive index for the TE0 polarized wave in the second waveguide 12b that is the second waveguide as counted from the light incidence plane 12a1, and $n_{g\_2\_TM}$ represents a group refractive index for the TM0 polarized wave in the second waveguide 12b. Note that in a case where the mode number and a polarization direction of light are not specified, a group refractive index is defined as $n_g$.

The inventors of the present application have found the following: (1) group refractive indexes of a rectangular waveguide are dependent on the width of the rectangular waveguide; and (2) a group refractive index of the TE0 mode and a group refractive index of the TM0 mode are correlated to the width of a rectangular wave guide, in different matters, respectively. The above will be described in detail later with reference to FIGS. 2 and 3.

When the first waveguide 12a has a width $W_1$ of 600 nm, the group refractive index $n_{g\_1\_TE0}$ is 4.095 while the group refractive index $n_{g\_i\_TM0}$ is 4.028. Accordingly, when the difference between the group refractive indexes $n_{g\_1\_TE0}$ and $n_{g\_1\_TM0}$ is defined as a group refractive index difference $\Delta n_{g\_1}$, the group refractive index difference $\Delta n_{g\_i}$ is 0.067 in the case where the width $W_1$ is 600 nm. Meanwhile, when the second waveguide 12b has a width $W_2$ of 800 nm, the group refractive index $n_{g\_2\_TE0}$ is 3.945 while the group refractive index $n_{g\_2\_TM0}$ is 4.130. Accordingly, the group refractive index difference $\Delta n_{g\_2}$ between the group refractive indexes $n_{g\_2\_TE0}$ and $n_{g\_2\_TM0}$ is −0.185.

A positive sign of the group refractive index difference means that the group velocity of a TE0 polarized wave is higher than that of a TM0 polarized wave. On the other hand, a negative sign of the group refractive index difference means that the group velocity of a TM0 polarized wave is higher than that of a TE0 polarized wave.

(Conditions to be Satisfied by Core 12)

The optical waveguide element 10 is arranged such that the first waveguide 12a and the second waveguide 12b having different signs of group refractive index differences, respectively, communicate with each other along the light propagation direction. Further, in the optical waveguide element 10, the length $L_1$ and the length $L_2$ are each set so as to satisfy the following Formula (1). This makes it possible to compensate polarization mode dispersion that occurs in the first waveguide 12a by polarization mode dispersion that occurs in the second waveguide 12b, and accordingly to reduce polarization mode dispersion of the core 12 as a whole.

[Math. 6]

$$\left| \sum_i L_i(n_{g\_i\_TE} - n_{g\_i\_TM}) \right| \leq 1.5 \times 10^{-3} [m], \quad (1)$$

where: $n_{g\_i\_TE}$ is the group refractive index of a TE0 polarized wave in the i-th waveguide as counted from the first edge face 12a1, and $n_{g\_i\_TM}$ is the group refractive index of a TM0 polarized wave in this i-th wave guide; and $L_i$[m] is the length of the i-th wave guide.

The condition expressed by the above Formula (1) is defined so that in a case where a TE0 polarized wave and a TM0 polarized wave propagate through the core 12, a propagation time difference $\Delta t$ between the TE0 polarized wave and the TM0 polarized wave is not more than 5 picoseconds. Hereinafter, the unit of time "picosecond" is denoted by [ps]. When the propagation time difference $\Delta t$ between the TE0 polarized wave and the TM0 polarized wave is not more than 5 ps, it is possible to suppress the propagation time difference $\Delta t$ to a level of not more than 0.05 UI (Unit Interval) of a modulated signal in a case where light propagating through the core 12 is an optical signal indicative of a 10 Gbps modulated signal. When the propagation time difference $\Delta t$ is suppressed to a level of not more than 0.05 UI of the modulated signal, an increase of a jitter component of the modulated signal falls within a range that causes no practical problem. Accordingly, in this case, the modulated signal is considered not to deteriorate. Therefore, with the above configuration, when a 10 Gbps modulated signal is propagated, the optical waveguide element 10 can compensate polarization mode dispersion to a level in a range that causes no practical problem.

Further, the optical waveguide element 10 is arranged preferably such that the length $L_1$ and the length $L_2$ are each set so as to satisfy the following Formula (2):

[Math. 7]

$$\left| \sum_i L_i(n_{g\_i\_TE} - n_{g\_i\_TM}) \right| \leq 5.0 \times 10^{-4} [m]. \quad (2)$$

The condition expressed by the above Formula (2) is defined so that in a case where a TE0 polarized wave and a TM0 polarized wave propagate through the core 12, the propagation time difference $\Delta t$ between the TE0 polarized wave and the TM0 polarized wave is not more than 1.67 ps. When the propagation time difference $\Delta t$ between the TE0 polarized wave and the TM0 polarized wave is not more than 1.67 ps, it is possible to suppress the propagation, time difference $\Delta t$ to a level of not more than 0.05 UI (Unit Interval) of a modulated signal in a case where light propagating through the core 12 is an optical signal indicative of a 30 Gbps modulated signal. Therefore, with the above configuration, when a 30 Gbps modulated signal is propagated, the optical waveguide element 10 can compensate polarization mode dispersion to a level in a range that causes no practical problem.

In addition, the optical waveguide element 10 is arranged more preferably such that the length $L_1$ and the length $L_2$ are each set so as to satisfy the following Formula (3).

[Math. 8]

$$\left|\sum_i L_i(n_{g\_i\_TE} - n_{g\_i\_TM})\right| = 0 \, [m] \quad (3)$$

When the condition expressed by the above Formula (3) is satisfied, the propagation time difference Δt between a TE0 polarized wave and a TM0 polarized wave becomes 0 ps in a case where the TE0 polarized wave and the TM0 polarized wave propagates through the core 12. In other words, there is no propagation time difference Δt, and polarization mode dispersion in the core 12 is completely compensated. With the above configuration, even in a case where an optical signal having a bit rate higher than 30 Gbps propagates through the core 12, a bit error associated with such propagation can be suppressed to a level in a range that causes no practical problem.

Modification of any of the above Formulae (1) to (3) makes it possible to define as below the length $L_1$ and the length $L_2$ each of which satisfies one of the above Formulae (1) to (3). Note that the entire length $L_T$ of the optical waveguide element 10 is defined as $L_T=L_1+L_2$. For example, in a case where the above Formula (1) is deformed after substitution of $L_2=L_T-L_1$ for $L_2$, the following is obtained: $(-1.5\times10^{-3}-L_T\Delta n_{g\_2})/(\Delta n_{g\_1}-\Delta n_{g\_2}) \le L_1 \le (1.5\times10^{-3}-L_T\Delta n_{g\_2})/(\Delta n_{g\_1}-\Delta n_{g\_2})$. Accordingly, if the entire length $L_T$ is set, a range of the length $L_1$ that satisfies the condition of the above Formula (1) will be set and as a result, the length $L_2$ corresponding to the length $L_1$ will be set.

The length $L_1$ and the length $L_2$ each satisfying the above Formula (2) is defined by modification as in the case of the above Formula (1).

Meanwhile, in a case where the above Formula (3) is deformed after substitution of $L_2=L_T-L_1$ in the Formula (3), the following is obtained: $L_1=-L_T\Delta n_{g\_2}/(\Delta n_{g\_1}-\Delta n_{g\_2})$. Accordingly, if the entire length $L_T$ is set, the length $L_1$ that satisfies the condition of the above Formula (3) will be set and as a result, the length $L_2$ corresponding to the length $L_1$ will be set.

As described above, the length $L_1$ and the length $L_2$ each satisfying any one of the above Formulae (1) to (3) can be set by using one of the above Formulae (1) to (3) modified after the entire length $L_T$ is set.

The optical waveguide element 10 in accordance with Embodiment 1, the entire length of the core 12 is set to 5000 μm, while the length $L_1$ is set to 3675 μm and the length $L_2$ is set to 1325 μm. The above Formula (2) is satisfied by the first waveguide 12a and the second waveguide 12b for which the length $L_1$ and the length $L_2$ are set as above. Therefore, the optical waveguide element 10 can be said to be an optical waveguide element capable of compensating polarization mode dispersion.

Note that in Embodiment 1, the above description assumes that the entire length of the optical waveguide element 10 is 5000 μm. However, the entire length of the optical waveguide element 10 is not limited to this length. In a case where a conventional rectangular waveguide is employed and this rectangular waveguide has an entire length at which a problem of polarization mode dispersion arises (e.g., an entire length of not less than 1000 μm), the optical waveguide element 10 is more effective.

(Production Cost of Optical Waveguide Element 10)

As described above, the optical waveguide element 10 is fabricated, with use of an SOI substrate, by patterning of an Si layer on the SOI substrate and subsequent formation of an $SiO_2$ oxide film i on the Si layer. Further, unlike respective optical waveguide elements disclosed in Patent Literatures 1 and 2, and Non-patent Literature 1, the optical waveguide element 10 requires no fabrication of a polarization rotation element in the optical waveguide element 10. This makes it possible to use a production process for silicon large-scale integrated circuits, as a production process for the optical waveguide element 10.

In light of the above, as compared to the respective optical waveguide elements disclosed in Patent Literatures 1 and 2, and Non-patent Literature 1, the optical waveguide element 10 can be produced at a lower production cost.

(Loss in Optical Waveguide Element 10)

In the optical waveguide element 10, the first waveguide 12a and the second waveguide 12b are connected to each other such that the second edge face 12a2 of the first waveguide 12a and the third edge face 12b3 of the second waveguide 12b are in contact with each other. In other words, the width of the core 12 discontinuously changes at a position at which the first waveguide 12a and the second waveguide 12b are connected to each other. In general, such a discontinuous structure of a waveguide becomes a factor causing reflection of light propagating through the wave guide.

Though more details will be discussed later with reference to FIG. 5, a direct connection of the first waveguide 12a and the second waveguide 12b in the optical waveguide element 10 led to a coupling loss of 0.082 dB for the TE0 polarized wave and a coupling loss of 0.02 dB for the TM0 polarized wave.

On the other hand, in the case of a polarization rotation element having a rib structure in the invention disclosed in Non-patent Literature 1, a conversion of a TE0 polarized wave to a TM0 polarized wave is accompanied by a conversion loss of approximately 0.8 dB.

Each of the coupling loss of the optical waveguide element 10 and the conversion loss of the polarization rotation element disclosed in Non-patent Literature 1 is loss caused by a configuration that is necessary for compensation of polarization mode dispersion. As described above, the coupling loss in the optical waveguide element 10 is always not more than 0.1 dB that is significantly smaller than the conversion loss of the polarization rotation element disclosed in Non-patent Literature 1. Therefore, the optical waveguide element 10 is a low-loss optical waveguide element as compared to the invention disclosed in Non-patent Literature 1.

As described above, the optical waveguide element 10 is a low-loss optical waveguide element as compared to a conventional optical waveguide element.

[Modification]

Embodiment 1 has discussed on the premise that the core 12 of the optical waveguide element 10 is made of the first waveguide 12a and the second waveguide 12b. However, the number of waveguides constituting the core 12 is not limited to two but can be three or more.

For example, the core 12 of the optical waveguide element 10 in accordance with the present modification can include not only the first waveguide 12a and the second waveguide 12b but also a third waveguide. When the width of the third waveguide is $W_3$, the length of the third waveguide is $L_3$, a group refractive index for a TE0 polarized wave in the third waveguide is $n_{g\_3\_TE}$, and a group refractive index for a TM0 polarized wave in the third waveguide is $n_{g\_3\_TM}$, the length $L_1$, $L_2$ and $L_3$ are each defined so as to satisfy the above Formula (1). Further, the length $L_1$, $L_2$ and $L_3$ each preferably satisfy the above Formula (2), and more preferably satisfy the above Formula (3).

In other words, the optical waveguide element 10 in accordance with the present modification is an optical waveguide element including: a core 12 made of a plurality of waveguides which have different widths, respectively, and communicate with each other; and a cladding 11 made of $SiO_2$. Further, the core 12 at least includes: a first waveguide 12a which has a width that makes a group refractive index difference $\Delta n_{g\_1}$ (which is a difference between the group refractive index $n_{g\_1\_TE}$ and the group refractive index $n_{g\_1\_TM}$) a positive value; and a second waveguide 12b which has a width that makes a group refractive index difference $\Delta n_{g\_2}$ (which is a difference between the group refractive index $n_{g\_2\_TE}$ and the group refractive index $n_{g\_2\_TM}$) a negative value.

EXAMPLE 1

(Group Refractive Index of Waveguide)

Figure 2:
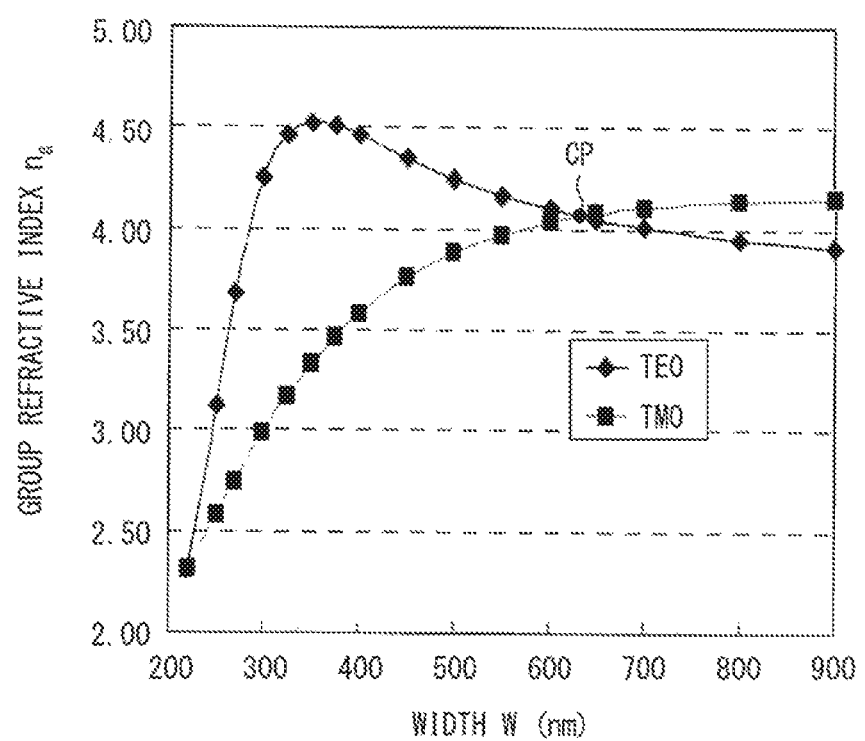
FIG. 2 is a graph showing respective group refractive indexes of a TE0 polarized wave and a TM0 polarized wave which are obtained in a case where the width of an Si waveguide having a thickness of 220 nm is changed.
Figure 3:
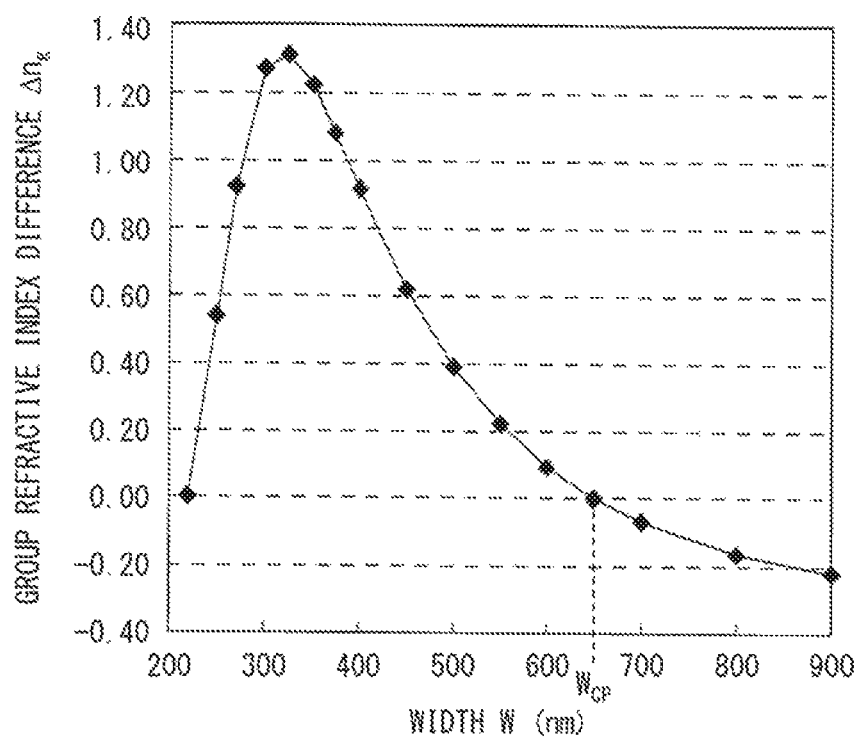
FIG. 3 is a graph showing a group refractive index difference that is a difference between the group refractive index of the TE0 polarized wave and the group refractive index of the TM0 polarized wave which are shown in FIG. 2.

The following description will discuss group refractive indexes of a waveguide produced in a production process similar to that for the core 12 of the optical waveguide element 10 in accordance with Embodiment 1, with reference to FIGS. 2 and 3. FIG. 2 is a graph showing respective group refractive indexes of a TE0 polarized wave and a TM0 polarized wave which are obtained in a case where the width W of an Si waveguide having a thickness of 220 nm is changed in a range of not less than 220 nm and not more than 900 nm. In the following description, the group refractive index of the TE0 polarized wave is defined as $n_{g\_TE0}$, and the group refractive index of the TM0 polarized wave is defined as $n_{g\_TM0}$. FIG. 3 is a graph showing a group refractive index difference that is a difference between the group refractive index $n_{g\_TE0}$ of the TE0 polarized wave and the group refractive index $n_{g\_TM0}$ of the TM0 polarized wave which are shown in FIG. 2. In the following description, a group refractive index difference $\Delta n_g$ is defined as $n_{g\_TE0} - n_{g\_TM0}$. Note that the wavelength of light propagating through the waveguide is 1.55 μm.

In a case where the width W of the waveguide was 220 nm, the group refractive index $n_{g\_TE0}$ was equal to the group refractive index $n_{g\_TM0}$. This is because the thickness of the waveguide is equal to the width of the wave guide.

In a case where the width W of the waveguide was increased from 220 nm, both the group refractive index $n_{g\_TE0}$ and the group refractive index $n_{g\_TM0}$ increase. However, a ratio of a change in group refractive index with respect to a change in the width W of the waveguide was different between the group refractive index $n_{g\_TE0}$ and the group refractive index $n_{g\_TM0}$. When the width W of the waveguide was increased from 220 nm, the group refractive index $n_{g\_TE0}$ exhibited a maximum value at the width W of 350 nm and also exhibited a gradual decrease in a width W range of not less than 350 nm and not more than 900 nm. Meanwhile, when the width W of the waveguide was increased from 220 nm, the group refractive index $n_{g\_TM0}$ increased. However, the group refractive index $n_{g\_TM0}$ exhibited a gradual decrease in slope of that increase of the group refractive index $n_{g\_TM0}$, and approached to one value.

As shown in FIG. 2, the group refractive index $n_{g\_TE0}$ and the group refractive index $n_{g\_TM0}$ intersected with each other at an intersection CP. In the following description, a width of the waveguide which width corresponds to the intersection CP is defined as a width $W_{CP}$. In other words, it was found that: at the width $W_{CP}$, the group refractive index $n_{g\_TE0}$=the group refractive index $n_{g\_TM0}$; in a region where the width W is smaller than the width $W_{CP}$, the group refractive index $n_{g\_TE0}$>the group refractive index $n_{g\_TM0}$; and in a region where the width W is larger than the width $W_{CP}$, the group refractive index $n_{g\_TE0}$<the group refractive index $n_{g\_TM0}$.

FIG. 3 shows dependency of the group refractive index difference $\Delta n_g$ on the width W of the waveguide. This dependency further clarified a change in magnitude relation between the group refractive index $n_{g\_TE0}$ and the group refractive index $n_{g\_TM0}$. It was found that in a case where the width W of the waveguide was changed, the group refractive index difference $\Delta n_g$ is 0 when the width W is $W_{CP}$, the group refractive index difference $\Delta n_g$ takes a positive value in a region where the width W is smaller than $W_{CP}$, and the group refractive index difference $\Delta n_g$ takes a negative value in a region where the width W is larger than $W_{CP}$.

In order for the optical waveguide element 10 to compensate polarization mode dispersion, the sign of the group refractive index difference $\Delta n_{g\_1}$ in the first waveguide 12a needs to be opposite to that of the group refractive index difference $\Delta n_{g\_2}$ in the second waveguide 12b. In order to satisfy such a condition, it is necessary that either one of the widths $W_1$ and $W_2$ is smaller than $W_{CP}$, whereas the other one of the widths $W_1$ and $W_2$ is larger than $W_{CP}$.

Note that in a case where a silicon optical waveguide element is fabricated so as to have a width W of less than 450 nm, a side wall(s) of the waveguide tends to be rough. In other words, it is difficult to form a waveguide whose side walls are flat. Such roughness of a side wall(s) occurs due to a technical limit in a lithography process, and becomes a cause of increase in loss of light propagating through the waveguide. Therefore, the widths $W_1$ and $W_2$ are each preferably in a range of 450 nm or more.

(Erroneous Conversion to Higher-Order Mode)

Figure 4:
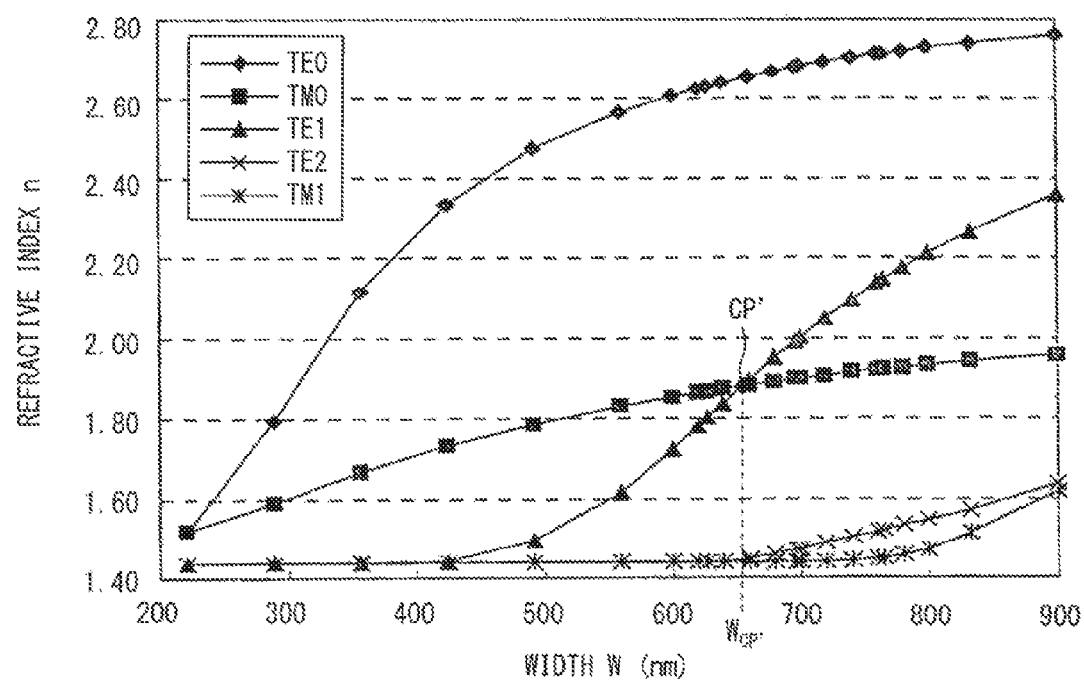
FIG. 4 is a graph showing respective refractive indexes of a TE0 polarized wave, a TM0 polarized wave, a TE1 polarized wave, a TM1 polarized wave, and a TE2 polarized wave which are obtained in a case where the width of an Si waveguide having a thickness of 220 nm is changed.

The following description will discuss refractive indexes of a waveguide produced in a production process similar to that of the core 12 of the optical waveguide element 10 in accordance with Embodiment 1, with reference to FIG. 4. FIG. 4 is a graph showing respective refractive indexes of a TE0 polarized wave, a TM0 polarized wave, a TE1 polarized wave, a TM1 polarized wave, and a TE2 polarized wave which are obtained in a case where the width W of the waveguide is changed. Note that the wavelength of light propagating through the waveguide is 1.55 μm.

In the following description, a refractive index of the TM0 mode is defined as $n_{TM0}$, while a refractive index of the TE1 mode is defined as $n_{TE1}$.

It was found that in a case where the width W is changed in a range of not less than 200 nm and not more than 900 nm, the refractive index $n_{TM0}$ and the refractive index $n_{TE1}$ intersect with each other at an intersection CP', as shown in FIG. 4. In the following description, the width W of the waveguide corresponding to the intersection CP' is defined as a width $W_{CP'}$. The width $W_{CP'}$ is approximately 650 nm.

The TM0 mode and the TE1 mode are in a state where a transition between the TM0 mode and the TE1 mode easily occurs when the refractive index $n_{TM0}$ is equal to the refractive index $n_{TE1}$ or the refractive index $n_{TM0}$ takes a value close to that of the refractive index $n_{TE1}$. When the TM0 mode and the TE1 mode are in such a state, the TM0 mode and the TE1 mode are coupled to each other by a minor disturbance as a trigger. One example of such a minor disturbance is roughness of a side wall(s) of a waveguide due to a production process.

When the TM0 mode and the TE1 mode are coupled to each other, an erroneous conversion of the TM0 mode to the TE1 mode that is a higher-order mode occurs with a higher possibility. Such an erroneous conversion is observed as a large loss in the TM0 mode. Accordingly, when the widths $W_1$ and $W_2$ are set, it is preferable to avoid setting the widths $W_1$ and $W_2$ in a range of more than 620 nm and less than 670 nm including the width $W_{CP}$. In other words, the widths $W_1$ and $W_2$ are each preferably within a range of not less than 450 nm and not more than 620 nm or a range of not less than 670 nm and not more than 800 nm. When the widths $W_1$ and $W_2$ are each not more than 800 nm, it is possible to prevent an increase in coupling loss described later.

The range that should be avoided in a case where the widths $W_1$ and $W_2$ are set can be also defined by the refractive index difference $\Delta n$ that is a difference between the refractive index $n_{TM0}$ and the refractive index $n_{TE1}$. The widths $W_1$ and $W_2$ are each preferably within a range in which the refractive index difference $\Delta n$ satisfies $\Delta n \geq 0.08$ so that the erroneous conversion between the TM0 mode and the TE1 mode will be prevented. With reference to FIG. 4, such a range of the width W which satisfies the above $\Delta n \geq 0.08$ is a range of not more than 620 nm or not less than 670 nm.

(Coupling Loss of Core 12)

Figure 5:
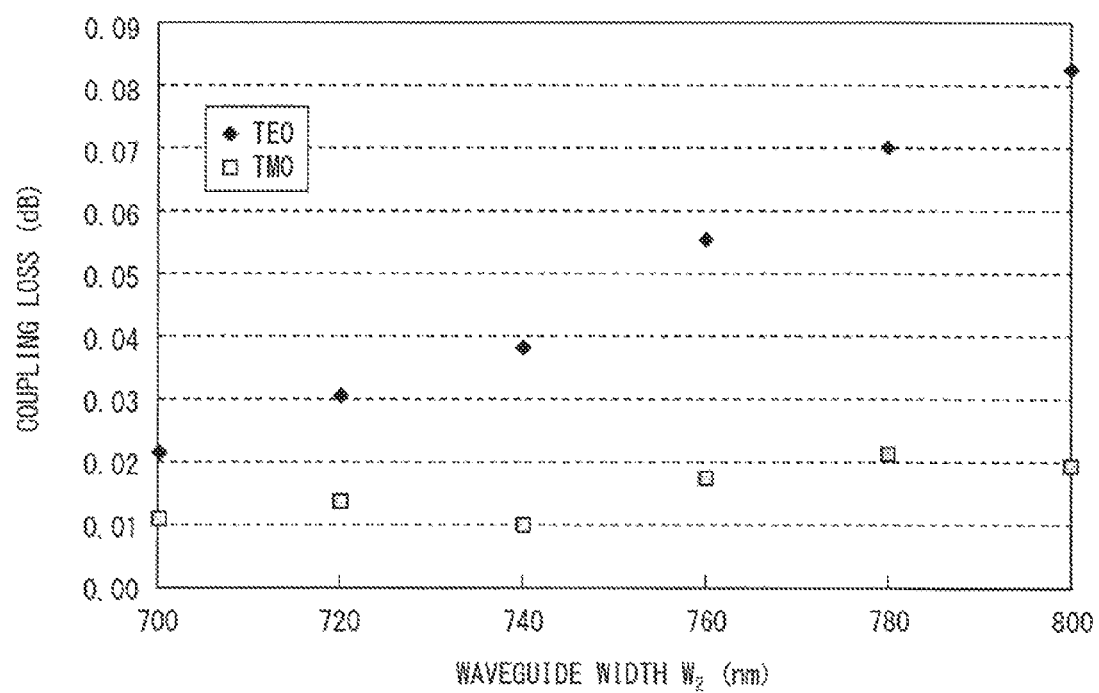
FIG. 5 is a graph showing coupling loss which is obtained in a case where a waveguide having a width of 600 nm is connected with a waveguide having a different width (a width that is not 600 nm).

The following description will discuss coupling loss in the core 12 provided in the optical waveguide element 10 in accordance with Embodiment 1, with reference to FIG. 5. More specifically, as described above with reference to FIG. 1, the core 12 is configured by a directly connection of the first waveguide 12*a* and the second waveguide 12*b*. FIG. 5 is a graph showing coupling loss which is obtained in a case where the first waveguide 12*a* having a width of 600 nm is directly connected with the second waveguide 12*b* having a width different from that of the first waveguide 12*a*. While the width $W_1$ of the first waveguide 12*a* is set to 600 nm, the width $W_2$ of the second waveguide 12*b* is changed in a range of not less than 700 nm and not more than 800 nm. Note that the wavelength of light propagating through the waveguide is 1.55 μm.

As shown in FIG. 5, it was found that in a case where the width $W_2$ of the second waveguide 12*b* was changed from 700 nm to 800 nm, light of the TE0 mode had coupling loss that monotonically increased in a range of lower than 0.09 dB and higher than 0.02 dB. Meanwhile, it was also found that light of the TM0 mode had coupling loss which did not exhibit clear dependency on the width $W_2$ and distributed in a range of lower than 0.03 dB and higher than 0 dB.

It was clear from the above result that in a case where the core 12 was formed by directly connecting the first waveguide 12*a* and the second waveguide 12 which had different widths, respectively, the core 12 had a coupling loss of less than 0.09 dB. This coupling loss of less than 0.09 dB is obviously smaller than the conversion loss (approximately 0.8 dB) in a polarization rotation element of an optical waveguide element disclosed in Non-patent Literature 1. Therefore, the optical waveguide element 10 in accordance with Embodiment 1 can be said to be a low-loss optical waveguide element as compared to the optical waveguide element disclosed in Non-patent Literature 1.

[Embodiment 2]

The following description will discuss an optical waveguide element in accordance with Embodiment 2 of the present invention, with reference to FIG. 6. (a) of FIG. 6 is a top view of an optical waveguide element 20 in accordance with Embodiment 2. (b) of FIG. 6 is a cross-sectional view of the optical waveguide element 20 taken along line C-C shown in (a) of FIG. 6. (c) of FIG. 6 is a cross-sectional view of the optical waveguide element 20 taken along line D-D shown in (a) of FIG. 6. (d) of FIG. 6 is a cross-sectional view of the optical waveguide element 20 taken along line E-E shown in (a) of FIG. 6. Note that each member identical to a member of Embodiment 1 is given an identical reference sign and an explanation thereof will be omitted. Further, a coordinate system shown in FIG. 6 is defined in the same manner as that shown in FIG. 1.

The optical waveguide element 20 is an optical waveguide element which is obtained by modifying, into a core 22, the core 12 in the optical waveguide element 10 in accordance with Embodiment 1. More specifically, the core 22 includes a first waveguide 12*a* that is a first waveguide as counted from a light incidence plane 12*a*1 and a second waveguide 12*b* that is a second waveguide as counted from the light incidence plane 12*a*1, and additionally a joint section 23 for connecting the first waveguide 12*a* and the second waveguide 12*b*. The core 22 can be described as a core in which the first waveguide 12*a* and the second waveguide 12*b* are connected to each other via the joint section 23, along a light propagation direction. Note that a cladding 21 of the optical waveguide element 20 is configured in a manner similar to the cladding 11 of the optical waveguide element 10 in accordance with Embodiment 1.

The joint section 23 is a waveguide made of Si, like the first waveguide 12*a* and the second waveguide 12*b*, and has a thickness of 220 nm.

As illustrated in (a) of FIG. 6, the first waveguide 12*a* and the joint section 23 are connected to each other via a second edge face 12*a*2 of the first waveguide 12*a* and one edge face on a negative side in a y axis direction between two edge faces of the joint section 23. The second edge face 12*a*2 can be described to form a boundary between the joint section 23 and the first waveguide 12*a*. Accordingly, the second edge face 12*a*2 is also referred to as a first boundary 12*a*2. Similarly, the second waveguide 12*b* and the joint section 23 are connected to each other via a third edge face 12*b*3 of the second waveguide 12*b* and the other one edge face on a positive side in the y axis direction between the two edge faces of the joint section 23. The third edge face 12*b*3 can also be described to form a boundary between the joint section 23 and the second waveguide 12*b*. Accordingly, the third edge face 12*b*3 is also referred to as a second boundary 12*b*3.

Here, as illustrated in (a) and (b) of FIG. 6, the length and the width of the first waveguide 12*a* is defined as $L_1$ and $W_1$, respectively. Further, as illustrated in (a) and (c) of FIG. 6, the length and the width of the joint section 23 is defined as $L_{23}$ and $W_{23}$, respectively. In addition, as illustrated in (a) and (d) of FIG. 6, the length and the width of the second waveguide 12*b* is defined as $L_2$ and $W_2$, respectively.

At the first boundary 12*a*2, the joint section 23 has the width $W_{23}$ that is equal to the width $W_1$ of the first waveguide 12*a*. At the second boundary 12*b*3, the joint section 23 has the width $W_{23}$ that is equal to the width $W_2$ of the second waveguide 12*b*. In the description of Embodiment 2, it is assumed that the width $W_1$ is 600 nm and the width $W_2$ is 800 nm. Accordingly, the width $W_{23}$ (first width) at the first boundary 12*a*2 is 600 nm, while the width $W_{23}$ (second width) at the second boundary 12*b*3 is 800 nm. The width $W_{23}$ continuously changes from the first boundary 12*a*2 to the second boundary 12*b*3 such that the first width (600 nm)

increases to the second width (800 nm). In other words, the joint section 23 has a tapered top surface.

The joint section 23 smoothly connects the first waveguide 12a and the second waveguide 12b which have different widths, respectively. This leads to an effect that coupling loss of the core 22 is reduced. In the core 22, the more the length $L_{23}$ is increased, the smaller the angle made between the y axis direction and a tapered part connecting the first waveguide 12a and the second waveguide 12b becomes. This further reduces the coupling loss in the core 22.

Meanwhile, the joint section 23 smoothly connects the first width that is equal to the width $W_1$ and the second width that is equal to the width $W_2$. Accordingly, at a position in an intermediate region of the joint section 23, the width $W_{23}$ is equal to the width $W_{CP'}$ corresponding to an intersection CP' at which a refractive index $n_{TM0}$ of a TM0 mode is equal to a refractive index $n_{TE1}$ of a TE1 mode (see FIG. 4).

As a result, an erroneous conversion of the TM0 mode to the TE1 mode that is a higher-order mode occurs with a higher probability in the intermediate region of the joint section 23. In other words, loss of the TM0 mode is increased in the intermediate region of the joint section 23. Therefore, in the core 22, the more the length $L_{23}$ is increased, the more the loss of the TM0 mode in the core 22 is increased.

In this way, increasing the length $L_{23}$ has both a positive effect that the coupling loss in the core 22 is reduced and a negative effect that the loss of the TM0 mode in the core 22 is increased. Preferably, in consideration of a trade-off between the above positive effect and the above negative effect, the length $L_{23}$ is set so that the loss of the core 22 as a whole can be optimized.

More specifically, the length $L_{23}$ is preferably not less than 10 μm and not more than 100 μm. When the length $L_{23}$ is not less than 10 μm, it is possible to effectively reduce the coupling loss of the core 22. On the other hand, when the length $L_{23}$ is not more than 100 μm, it is possible to prevent the loss of the TM0 mode from increasing due to the above erroneous conversion in the joint section 23.

[Embodiment 3]

The following description will discuss an optical waveguide element in accordance with Embodiment 3 of the present invention, with reference to FIG. 7. FIG. 7 is a top view of an optical waveguide element 30 in accordance with Embodiment 3. Note that each member identical to a member of any of the above Embodiments is given an identical reference sign and an explanation thereof will be omitted. Further, a coordinate system shown in FIG. 7 is defined in the same manner as that shown in FIG. 1.

The optical waveguide element 30 is an optical waveguide element obtained by modifying, into a core 32, the core 22 in the optical waveguide element 20 in accordance with Embodiment 2. More specifically, the core 32 includes a conversion section 35 as well as a first waveguide 12a, a second waveguide 12b, and a joint section 23. In the following description, between two ends of the conversion section 35, one end on a light incident side (on a negative side in a y axis direction) is referred to as a fifth edge face 351, while the other end on a light exit side (on a positive side in the y axis direction) is referred to as a sixth edge face 352. Further, in the following description, the width and the length of the conversion section 35 are defined as $W_{35}$ and $L_{35}$, respectively.

The sixth edge face 352 of the conversion section 35 is continuously connected with a light incident side end of a plurality of waveguides which communicate with each other. The plurality of waveguides includes the first waveguide 12a, the second waveguide 12b, and the joint section 23. In other words, the sixth edge face 352 of the conversion section 35 is continuously connected with a first edge face 12a1. That is, the sixth edge face 352 has a width $W_{35}$ that is equal to the width $W_1$. In Embodiment 3, the width $W_{35}$ at the sixth edge face 352 is 600 nm.

Further, the fifth edge face 351 serves as a light incidence plane of the core 32. Accordingly, the fifth edge face 351 can be also referred to as a light incidence plane 351. The width $W_{35}$ of the light incidence plane 351 is smaller than the width $W_{35}$ of the sixth edge face 352. In Embodiment 3, the width $W_{35}$ of the light incidence plane 351 is 250 nm. Accordingly, whereas the joint section 23 has a tapered top surface, the conversion section 35 has an inverse-tapered top surface. Note that the width $W_{35}$ of the light incidence plane 351 is not limited to 250 nm, but is preferably in a range of not less than 200 nm and not more than 300 nm.

The conversion section 35 is a waveguide for reducing coupling loss which occurs in a case where a waveguide mode in an optical fiber provided so as to abut against the light incidence plane 351 is converted to a waveguide mode in the first waveguide 12a connected to the sixth edge face 352. When the conversion section 35 has an inverse-tapered top surface, the conversion section 35 can connect, in a favorable state, the first waveguide 12a with an optical fiber which has a core diameter larger than the width $W_{35}$ of the light incidence plane 351.

The length $L_{35}$ of the conversion section 35 can be set, in accordance with parameters including the width $W_{35}$ of the light incidence plane 351, the width $W_{35}$ of the sixth edge face 352, and a core diameter of the optical fiber against which the light incidence plane 351 abuts, so that coupling efficiency can be optimized. In a case where the width $W_{35}$ of the light incidence plane 351 is 250 nm, the width $W_{35}$ of the sixth edge face 352 is 600 nm, and the core diameter of the optical fiber against with the light incidence plane 351 abuts is 8 μm, the length $L_{35}$ is preferably not less than 200 μm and not more than 300 μm, more preferably 250 μm. Note that the length $L_{35}$ of the conversion section 35 is not limited to the above range.

Note that in the optical waveguide element 30, the length $L_1$ of the first waveguide 12a and the length $L_2$ of the second waveguide 12b are preferably set so as to make it possible to carry out compensation including compensation of polarization mode dispersion which occurs in the conversion section 35.

[Embodiment 4]

The following description will discuss a light-receiving device in accordance with Embodiment 4 of the present invention, with reference to FIG. 8. FIG. 8 is a top view of a light-receiving element 40 in accordance with Embodiment 4. Note that each member identical to a member of any of the above Embodiments is given an identical reference sign and an explanation thereof will be omitted. Further, a coordinate system shown in FIG. 8 is defined in the same manner as that shown in FIG. 1.

The light-receiving device 40 includes an optical waveguide element 30 in accordance with Embodiment 3, and a light-receiving element 41. The light-receiving element 41 is, for example, a photodiode (PD). Therefore, hereinafter, the light-receiving element 41 is also referred to as a PD 41.

The PD 41 is provided with a light-receiving section 42. The light-receiving section 42 is arranged so as to be opposed to a light exit plane 12b4 of a core 32 provided in the optical waveguide element 30. The light exit plane 12b4 and the light-receiving section 42 can be provided so as to abut against each other or alternatively can be provided so as to be spaced apart from each other.

With the above configuration, the light-receiving device 40 can detect, by the light-receiving section 42 of the PD 41, light having propagated through the optical waveguide element 30 in a positive direction of a y axis, and then output, to the outside of the light-receiving device 40, an electric signal in accordance with this light having propagated through the optical waveguide element 30. Therefore, the light-receiving device 40 can convert an optical signal to an electric signal.

[Embodiment 5]

The following description will discuss an optical communication device in accordance with Embodiment 5 of the present invention, with reference to FIG. 9. FIG. 9 is a top view of an optical communication device 50 in accordance with Embodiment 5. Note that each member identical to a member of any of the above Embodiments is given an identical reference sign and an explanation thereof will be omitted. Further, a coordinate system shown in FIG. 9 is defined in the same manner as that shown in FIG. 1.

The optical communication device 50 is an optical communication device which can transmit and receive respective optical signals for four channels. More specifically, the optical communication device 50 serves as an interface section in an active optical cable (AOC) in conformity with a communications standard such as Camera Link (registered trademark). Further, the optical communication device 50 is formed on one SOI substrate.

The optical communication device 50 includes an optical signal transmission system, and an optical signal receiving system so as to transmit and receive optical signals. Note that the optical communication device 50 includes four equivalent structures so as to transmit and receive respective optical signals for four channels. In Embodiment 5, each of these four equivalent structures is not distinguished from the other structures. In other words, the description in Embodiment 5 commonly applies to each of all the four equivalent structures.

(Optical Signal Transmission System)

As illustrated in FIG. 9, the optical signal transmission system in the optical communication device 50 includes an optical modulator 51, a laser diode (LD) 52, a control IC 53, a conversion section 35', a wiring 55 connecting an external device and the control IC 53, another wiring 56 connecting the control IC 53 and the optical modulator 51, still another wiring 59 connecting the control IC 53 and the LD 52, an optical fiber 60 connecting the LD 52 and the optical modulator 51, and anther optical fiber 61.

The control IC 53 controls the LD 52 and the optical modulator 51 in accordance with a control signal which is inputted from the external device via the wiring 55. More specifically, the control IC 53 not only outputs, to the LD 52 via the wiring 59, an LD control signal for controlling the LD 52, but also outputs a modulated signal to the optical modulator 51 via the wiring 56.

The LD 52 outputs, to the optical modulator 51 via the optical fiber 60, laser light in accordance with a control signal obtained from the control IC 53.

The optical modulator 51 includes in total four optical modulation sections (not illustrated) which are provided so as to correspond to the four channels, respectively. The optical modulation section modulates light which is an input from the LD 52 in accordance with a modulated signal having been inputted by the control IC 53, and thereby generates an optical signal. The optical modulation section has a light exit plane that is connected to a light incidence plane (corresponding to the sixth edge face 352 illustrated in FIG. 7) of the conversion section 35'. Accordingly, the optical signal generated by the optical modulation section is caused to enter the conversion section 35', propagate in a negative direction of a y axis through the conversion section 35', and exit through a light exit plane of the conversion section 35' (the fifth edge face 351 illustrated in FIG. 7).

Note that the optical modulation section of the optical modulator 51 and the conversion section 35' are formed inside a silica cladding 31 which is formed on the SOI substrate. Accordingly, the optical modulation section can be an optical modulator 70 described later in Embodiment 6.

The optical fiber 61 includes a core 62 and a cladding 63. The optical fiber 61 has a first end connected to the conversion section 35'. More specifically, the core 62 has a light incidence plane that abuts against the light exit plane of the conversion section 35'. Accordingly, the optical signal having exited from the conversion section 35' is caused to enter the optical fiber 61, and then propagate in the negative direction of the y axis through the optical fiber 61.

The optical fiber 61 also has a second end (not illustrated) which is the other end of the optical fiber 61. At this second end, a structure identical to that of the optical signal receiving system described below is provided. Accordingly, the optical signal propagating in the negative direction of the y axis through the optical fiber 61 is received by the optical signal receiving system which is provided at the second end of the optical fiber 61.

(Optical Signal Receiving System)

As illustrated in FIG. 9, the optical signal receiving system provided in the optical communication device 50 includes an output IC 54, a PD 41, an optical waveguide element 30, a wiring 58 connecting the external device and the output IC 54, a wiring 57 connecting the output IC 54 and the PD 41, and an optical fiber 64.

The optical fiber 64 is an optical fiber configured in the same manner as the optical fiber 61. The optical fiber 64 includes a core 65 and a cladding 66. The core 65 has a light exit plane which abuts against a light incidence plane (corresponding to the light incidence plane 351 illustrated in FIG. 7) of the optical waveguide element 30. Further, the optical waveguide element 30 has a light exit plane (corresponding to the light exit plane 12b4 illustrated in FIG. 7) which abuts against a light-receiving section 42 (see FIG. 8) of the PD 41.

The optical fiber 64 has a first end (not illustrated) at which a structure identical to the above-described optical signal transmission system is provided. Accordingly, an optical signal enters the first end of the optical fiber 64 and propagates through the optical fiber 64 in a positive direction of the y axis. Then, the optical signal enters the core 32 through a light incidence plane of the core 32 (see FIG. 7) of the optical waveguide element 30.

The optical signal having entered the core 32 propagates in the positive direction of the y axis through the core 32, and then enters the light-receiving section 42 of the PD 41 through a light exit plane of the core 32.

The PD 41 detects the optical signal having entered the light-receiving section 42, and then outputs, to the output IC 54, an electric signal corresponding to the optical signal.

The output IC 54 processes the electric signal inputted from the PD 41 so that the electric signal will conform to a format defined by the communications standard. Then, the output IC 54 outputs, as an output signal, the electric signal thus processed to the external device.

Since the optical communication device 50 includes the optical signal receiving system which is provided with the optical waveguide element 30, the optical communication device 50 receives and processes an optical signal whose polarization mode dispersion has been reduced. As a result, the optical communication device 50 outputs an output signal in accordance with the optical signal. Therefore, the optical communication device 50 can deal with a higher bit rate as compared to an optical communication device which does not include the optical waveguide element 30.

[Embodiment 6]

The following description will discuss an optical modulator in accordance with Embodiment 6 of the present invention, with reference to FIG. 10. FIG. 10 is a top view of an optical modulator 70 in accordance with Embodiment 6.

The optical modulator 70 is a silicon optical modulator which is fabricated by using an SOI substrate. The optical modulator 70 includes a core 70a and a cladding 71. The core 70a serves as a Mach-Zehnder interferometer, including at least two waveguides which communicate with each other along a light propagation direction. The core 70a is made of Si and configured to have a thickness of not less than 210 nm and not more than 230 nm. Meanwhile, the cladding 71 is made of $SiO_2$.

As illustrated in FIG. 10, the core 70a serving as a Mach-Zehnder interferometer includes an incident side waveguide 72, an exit side waveguide 73, a first arm 74a, and a second arm 74b. Further, the first arm 74a is provided with a first asymmetric portion 75a, while the second arm 74b is provided with a second asymmetric portion 75b. Light having propagated in a positive direction of an x axis through the incident side waveguide 72 branches into two portions one of which propagates through the first arm 74a and the other one of which propagates through the second arm 74b. Subsequently, the light portions having propagated through the first arm 74a and the second arm 74b, respectively, merge in the exit side waveguide 73. The light having thus merged is caused to exit from the optical modulator 70.

Unlike the second asymmetric portion 75b of the second arm 74b, the first asymmetric portion 75a of the first arm 74a is configured to additionally include a first waveguide 76, a second waveguide 77, and a third waveguide 78. Therefore, a set of the first waveguide 76, second waveguide 77, and third waveguide 78 serve as a waveguide set that produces a difference between the first arm 74a and the second arm 74b.

Here, the first waveguide 76 has a first edge face 761 which is defined as a first end of the waveguide set that produces the difference. The first waveguide 76 is a first waveguide as counted from the first end, the second waveguide 77 is a second waveguide as counted from the first end, and the third waveguide 78 is a third waveguide as counted from the first end. Note that in such count of waveguides from the first end, only the waveguides that produce the difference are counted.

In the following description, the length of the first waveguide 76 is defined as $L_1$, the length of the second waveguide 77 is defined as $L_2$, and the length of the third waveguide 78 is defined as $L_3$. Then, $\Delta L$ that is a difference between the length of the first arm 74a and the length of the second arm 74b (a difference between the first arm 74a and the second arm 74b) is defined as $\Delta L = L_1 + L_2 + L_3$.

Further, the width of the first waveguide 76 is defined as $W_{76}$, the width of the second waveguide 77 is defined as $W_{77}$, and the width of the third waveguide 78 is defined as $W_{78}$. In Embodiment 6, it is assumed that the width $W_{76}$ is 600 nm, the width $W_{77}$ is 800 nm, and the width $W_{78}$ is 600 nm.

As discussed in Embodiment 1, the group refractive index of a waveguide made of Si varies depending on the width of the waveguide. In the following description, a group refractive index of a TE0 mode in the first waveguide 76 is defined as $n_{g\_1\_TE}$, and a group refractive index of a TM0 mode in the first waveguide 76 is defined as $n_{g\_1\_TM}$. Similarly, a group refractive index of a TE0 mode in the second waveguide 77 is defined as $n_{g\_2\_TE}$, and a group refractive index of a TM0 mode in the second waveguide 77 is defined as $n_{g\_2\_TM}$. Further, a group refractive index of a TE0 mode in the third waveguide 78 is defined as $n_{g\_3\_TE}$, and a group refractive index of a TM0 mode in the third waveguide 78 is defined as $n_{g\_3\_TM}$. Since the width $W_{76}$ is equal to the width $W_{78}$, the group refractive indexes $n_{g\_1\_TE}$ and $n_{g\_1\_TM}$ in the first waveguide 76 are equal to the group refractive indexes $n_{g\_3\_TE}$ and $n_{g\_3\_TM}$ in the third waveguide 78, respectively.

In order that light of the TE0 mode having propagated through the first arm 74a and light of the TE0 mode propagated through the second arm 74b enhance each other when the light of the TE0 mode in the first arm 74a and the light of the TE0 mode in the second arm 74b merge in the exit side waveguide 73, the above $L_1$, $L_2$, and $L_3$ each need to satisfy the following Formula (4):

[Math. 9]

$$\left|\sum_i L_i n_{g\_i\_TE}\right| = m\lambda[m], \quad (4)$$

where: m is an integer; and $\lambda$ is a wavelength of propagating light.

Similarly, in order that light of the TM0 mode having propagated through the first arm 74a and light of the TM0 mode having propagated through the second arm 74b enhance each other when the light of the TM0 mode in the first arm 74a and the light of the TM0 mode in the second arm 74b merge in the exit side waveguide 73, the above $L_1$, $L_2$, and $L_3$ each need to satisfy the following Formula (5).

[Math. 10]

$$\left|\sum_i L_i n_{g\_i\_TM}\right| = m\lambda[m] \quad (5)$$

Further, the above lengths $L_1$, $L_2$, and $L_3$ are each set so as to satisfy the following Formula (6). This is intended to equalize, in a range that causes no practical problem, a wavelength at which the light of the TE0 mode is enhanced and a wavelength at which the light of the TM0 mode is enhanced with each other, at the time when the light of the TM0 mode having propagated through the first arm 74a and the light of the TM0 mode having propagated through the second arm 74b merge in the exit side waveguide 73.

[Math. 11]

$$\left|\sum_i L_i (n_{g\_i\_TE} - n_{g\_i\_TM})\right| \le 1.5 \times 10^{-3}[m] \quad (6)$$

Further, the above lengths $L_1$, $L_2$, and $L_3$ each preferably satisfy the following Formula (7).

[Math. 12]

$$\left|\sum_i L_i(n_{g\_i\_TE} - n_{g\_i\_TM})\right| \leq 5.0 \times 10^{-4} [m] \quad (7)$$

When the length $L_1$, $L_2$, and $L_3$ each satisfy the above Formula (7), the optical modulator 70 can more precisely equalize the wavelength at which the light of the TE0 mode is enhanced and the wavelength at which the light of the TM0 mode is enhanced with each other.

Further, it is more preferable that the above lengths $L_1$, $L_2$, and $L_3$ each satisfy the following Formula (8).

[Math. 13]

$$\left|\sum_i L_i(n_{g\_i\_TE} - n_{g\_i\_TM})\right| = 0 [m] \quad (8)$$

When the length $L_1$, $L_2$, and $L_3$ each satisfy the above Formula (8), the optical modulator 70 can make the wavelength at which the light of the TE0 mode is enhanced equal to the wavelength at which the light of the TM0 mode is enhanced.

The lengths $L_1$, $L_2$, and $L_3$ can be set on the basis oft L which is a difference between the length of the first arm 74a and the length of the second arm 74b. For example, the lengths $L_1$, $L_2$, and $L_3$ can be set by solving simultaneous equations of the above Formula (7), $L_1+L_2+L_3=\Delta L$, and $L_1+L_2=L_3$. For example, as one set of solutions in a case where $\Delta L$ is set to 5000 μm, the following is obtained: $L_1=1175$ μm, $L_2=1325$ μm, and $L_3=2500$ μm.

Since the optical modulator 70 is fabricated by using an SOI substrate, the optical modulator 70 can be formed on one substrate together with various silicon devices. For example, the optical modulator 70 is usable as an optical modulation section in the optical communication device 50 described in Embodiment 5.

[Embodiment 7]

The following description will discuss an optical resonator in accordance with Embodiment 7 of the present invention, with reference to FIGS. 11 and 12. FIG. 11 is a top view of an optical resonator 80 in accordance with Embodiment 7. FIG. 12 is a top view of an optical resonator 90 in accordance with Embodiment 7.

The optical resonator 80 is a silicon optical modulator which is fabricated by using an SOI substrate. The optical resonator 80 is a ring resonator which includes a ring waveguide 83 in which a plurality of waveguides communicate with each other in a ring form along a light propagation direction, a second core 82 electromagnetically coupled to the ring waveguide 83 so as to resonate with the ring waveguide 83, and a cladding 81. The ring waveguide 83 is a ring waveguide which includes a first waveguide 84 and a second waveguide 85, and serves as a first core. The second core 82 and the ring waveguide 83 are each made of Si and have a thickness of not less than 210 nm and not more than 230 nm. Meanwhile, the cladding 81 is made of SiO$_2$.

The first waveguide 84 has a first edge face 841 and a second edge face 842. The second waveguide 85 has a third edge face 853 and a fourth edge face 854. The first waveguide 84 and the second waveguide 85 communicate with each other along the light propagation direction via the second edge face 842 and the third edge face 853, and also communicate with each other along the light propagation direction via the first edge face 841 and the fourth edge face 854.

Here, the first edge face 841 of the first waveguide 84 is defined as a reference plane of the ring waveguide 83. Then, the first waveguide 84 is a first waveguide as counted from the reference plane, that is, the first edge face 841, while the second waveguide 85 is a second waveguide as counted from the reference plane. Note that in such count of waveguides from the reference plane, the waveguides are counted in a clockwise direction along a communicating direction in the ring waveguide 83.

In Embodiment 7, the width $W_1$ of the first waveguide 84 is 600 nm, and the width $W_2$ of the second waveguide 85 is 800 nm. Further, hereinafter, the length of a central axis of the first waveguide 84 is defined as $L_1$, and the length of a central axis of the second waveguide 85 is defined as $L_2$. In addition, a circumferential length L of the ring waveguide 83 is defined as $L=L_1+L_2$.

Here, a group refractive index of a TE0 mode in the first waveguide 84 is defined as $n_{g\_1\_TE}$, and a group refractive index of a TM0 mode in the first waveguide 84 is defined as $n_{g\_1\_TM}$. Meanwhile, a group refractive index of a TE0 mode in the second waveguide 85 is defined as $n_{g\_2\_TE}$, and a group refractive index of a TM0 mode in second waveguide 85 is defined as $n_{g\_2\_TM}$.

The lengths $L_1$ and $L_2$ in the optical resonator 80 are each set so as to satisfy the following Formula (9).

[Math. 14]

$$\left|\sum_i L_i(n_{g\_i\_TE} - n_{g\_i\_TM})\right| \leq 1.5 \times 10^{-3} [m] \quad (9)$$

When the lengths $L_1$ and $L_2$ each satisfy the above Formula (9), polarization mode dispersion in the ring waveguide 83 is compensated. Therefore, in the optical resonator 80, the resonant wavelength of a TE0 mode and the resonant wavelength of a TM0 mode are equalized with each other in a range that causes no practical problem, Note that the resonant wavelength can also be called a resonant spectrum.

Further, the lengths $L_1$ and $L_2$ each, preferably satisfy the following Formula (10).

[Math. 15]

$$\left|\sum_i L_i(n_{g\_i\_TE} - n_{g\_i\_TM})\right| \leq 5.0 \times 10^{-4} [m] \quad (10)$$

When the lengths $L_1$ and $L_2$ each satisfy the above Formula (10), the optical resonator 80 can more precisely equalize the resonant wavelength of the TE0 mode and the resonant wavelength of the TM0 mode with each other.

In addition, it is more preferable that the above lengths $L_1$ and $L_2$ each satisfy the following Formula (11).

[Math. 16]

$$\left|\sum_i L_i(n_{g\_i\_TE} - n_{g\_i\_TM})\right| = 0 [m] \quad (11)$$

When the lengths $L_1$ and $L_2$ each satisfy the above Formula (11), the optical resonator 80 can make the resonant wavelength of the TE0 mode equal to the resonant wavelength of the TM0 mode.

The lengths $L_1$ and $L_2$ can be set on the basis of the circumferential length L of the ring waveguide 83. For example, the lengths $L_1$ and $L_2$ can be set by solving simultaneous equations of Formula (7) and $L_1+L_2=L$. For example, as one set of solutions in a case where L is set to 5000 μm, the following is obtained. $L_1=3675$ μm and $L_2=1325$ μm.

As described above, the optical resonator 80 can compensate polarization mode dispersion which occurs in the ring waveguide 83, and can dissolve polarization dependency in the optical resonator 80.

The optical resonator 90 illustrated in FIG. 12 is a modification of the optical resonator 80. More specifically, the optical resonator 90 includes a ring waveguide 83 in which at least two waveguides communicate with each other, along a light propagation direction, and a second core 92 and a third core 96 each of which is electromagnetically coupled to the ring waveguide 83 so as to resonate with the ring waveguide 83. In other words, the optical resonator 90 is an open ring resonator.

With the above configuration, the optical resonator 90 yields an effect similar to that of the optical resonator 80.

[Additional Statements]

An optical waveguide element in accordance with an aspect of the present invention is arranged preferably such that: the length $L_{\_i}[m]$ satisfies the following relation:

[Math. 2]

$$\left|\sum_i L_i(n_{g\_i\_TE} - n_{g\_i\_TM})\right| \leq 5.0 \times 10^{-4} \ [m]$$

With the above configuration, the optical waveguide element in accordance with an aspect of the present invention can more accurately compensate polarization mode dispersion.

An optical waveguide element in accordance with an aspect of the present invention is arranged preferably to further include: a joint section for connecting the i-th waveguide and an (i+1)th waveguide, at a first boundary between the i-th waveguide and the joint section, the joint section having a first width that is equal to a width of the i-th waveguide, at a second boundary between the joint section and the (i+1)th waveguide, the joint section having a second width that is equal to a width of the (i+1)th waveguide, and the first width continuously changing from the first boundary to the second boundary such that the first width increases to the second width.

With the above configuration, the optical waveguide element in accordance with an aspect of the present invention further includes a joint section for connecting the i-th waveguide and the (i+1)th waveguide in a continuous manner. As compared to a case where the i-th waveguide and the (i+1)th waveguide are directly connected with each other, the joint section makes it possible to suppress coupling loss caused by connecting the i-th waveguide and the (i+1)th waveguide. Therefore, the optical waveguide element in accordance with an aspect of the present invention can suppress coupling loss.

An optical waveguide element in accordance with an aspect of the present invention is arranged preferably such that: the i-th waveguide is directly connected with an (i+1)th waveguide.

With the above configuration, as compared to a case where the joint section is provided for connecting the i-th waveguide and the (i+1)th waveguide, the size of the optical waveguide element can be easily reduced.

An optical waveguide element in accordance with an aspect of the present invention is arranged preferably such that: the plurality of waveguides is two waveguides.

Such a two-waveguide configuration is the simplest configuration among configurations including the plurality of waveguides. Therefore, the above configuration can provide an optical waveguide element capable of compensating polarization mode dispersion by a simple structure.

An optical waveguide element in accordance with an aspect of the present invention is preferably arranged such that: the core has an entire length of not less than 1000 μm.

The optical waveguide element in accordance with an aspect of the present invention can compensate polarization mode dispersion, even in a case where a conventional rectangular waveguide is employed and the conventional rectangular waveguide has a size that leads to a problem of polarization mode dispersion. In other words, the present optical waveguide element yields a more remarkable effect in a case where an optical waveguide element has a size that leads to a problem of polarization mode dispersion.

An optical waveguide element in accordance with an aspect of the present invention is arranged preferably such that: the core has a thickness in a range of not less than 210 nm and not more than 230 nm.

With the above configuration, the core can be fabricated by patterning of an Si layer of an SOI substrate available on the market. In other words, the optical waveguide element can be fabricated by using an SOI substrate available on the market. Therefore, the above configuration can lead to production cost reduction of the optical waveguide element.

The optical waveguide element in accordance with an aspect of the present invention is arranged preferably such that: the core further includes a conversion section; the conversion section has a light exit side end connected to a light incident side end of the plurality of waveguides that communicate with each other, the light incident side end of the plurality of waveguides serving as the light incidence plane of the core; and the light incident side end of the conversion section has a width that is smaller than a width of the light incident side end of the plurality of waveguides.

With the above configuration, the conversion section can convert between a polarization mode of the core and a polarization mode of light distributed wider than that at the light incidence plane of the core, suppressing coupling loss. Accordingly, the optical waveguide element in accordance with an aspect of the present invention is capable of reducing coupling loss in a case where the outside of the core is coupled to the inside of the core or the inside of the core is coupled to the outside of the core.

A light-receiving device in accordance with an aspect of the present invention is arranged preferably to include: an optical waveguide element in accordance with an aspect of the present invention; and a light-receiving element including a light-receiving section that is arranged so as to be opposed to a light exit plane of the core of the optical waveguide element.

With the above configuration, the light-receiving device in accordance with an aspect of the present invention detects, by the light-receiving section, an optical signal having propagated through the optical waveguide element in accordance with an aspect of the present invention, and then outputs, to the outside of the light-receiving device, an electric signal corresponding to that optical signal having propagated through the optical waveguide element. The optical waveguide element in accordance with an aspect of the present invention can compensate polarization mode dispersion. Accordingly, the light-receiving device in accordance with an aspect of the present invention can detect an optical signal having less polarization mode dispersion, and can output an electric signal that is excellent in signal characteristics.

An optical communication device in accordance of an aspect of the present invention is arranged preferably to include: a light-receiving device in accordance with an aspect of the present invention; a laser diode for outputting an optical signal; and an optical modulator for modulating the optical signal that is inputted from the laser diode.

With the above configuration, it is possible to provide, at a low production cost, a compact optical communication device capable of transmitting and receiving an optical signal.

An optical communication device in accordance with an aspect of the present invention is arranged preferably to further include: an output IC for outputting, to an external device, an output signal in accordance with an electric signal that is inputted from the light-receiving device, the electric signal indicating the optical signal having been received by the light-receiving device; and a control IC for controlling the laser diode and the optical modulator, in accordance with a control signal that is inputted from the external device.

With the above configuration, an optical communication device in accordance with an aspect of the present invention includes an optical waveguide element in accordance with an aspect of the present invention and an output IC. Accordingly, an electric signal to be processed by the output IC is an electric signal corresponding to an optical signal whose polarization mode dispersion is compensated. Accordingly, this electric signal has excellent signal characteristics. Therefore, the optical communication device in accordance with an aspect of the present invention can deal with a higher bit rate as compared to an optical communication device which does not include an optical waveguide element in accordance with an aspect of the present invention.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to an optical waveguide for guiding light, more specifically to an optical waveguide made of silicon-based materials.

REFERENCE SIGNS LIST 10, 20, 30 optical waveguide element
11, 31, 71, 81, 91 cladding
12, 22, 32, 70a core
12a, 76, 84 first waveguide
12a1 first edge face (light incidence plane of core 12)
12a2 second edge face (first boundary)
12b, 77, 85 second waveguide
12b3, 853 third edge face (second boundary)
12b4, 854 fourth edge face (light exit plane of core 12)
23 joint section
35, 35' conversion section
351 fifth edge face (light incident side end, light incidence plane)
352 sixth edge face (light exit side end)
40 light-receiving device
41 light-receiving element (PD)
42 light-receiving section
50 optical communication device
51 modulator
52 laser diode (LD)
53 control IC
54 output IC
55, 56, 57, 59 wiring
60, 61, 64 fiber
70 optical modulator
72 incident side waveguide
73 exit side waveguide
74a first arm
74b second arm
75a first asymmetric portion
75b second asymmetric portion
761 first edge face (first end of waveguide that produces a difference)
78 third waveguide
80, 90 optical resonator
82, 92 second core
83 ring waveguide
841 first edge face (reference plane of ring wave guide)
96 third core

The invention claimed is:

1. An optical waveguide element comprising:
a core made of Si, the core including a plurality of waveguides having different widths, respectively, the plurality of waveguides communicating with each other along a light propagation direction; and
a cladding made of $SiO_2$,
when an i-th waveguide of the plurality of waveguides, as counted from a light incidence plane of the core, has a length $L_i[m]$, the length $L_i[m]$ satisfying the following relation:

[Math. 1]

$$\left| \sum_i L_i (n_{g\_i\_TE} - n_{g\_i\_TM}) \right| \leq 1.5 \times 10^{-3} [m],$$

where $n_{g\_i\_TE}$ is a group refractive index of a TE0 polarized wave in the i-th waveguide, and $n_{g\_i\_TM}$ is a group refractive index of a TM0 polarized wave in the i-th waveguide.

2. The optical waveguide element as set forth in claim 1, wherein:
the length $L_i[m]$ satisfies the following relation:

[Math. 2]

$$\left| \sum_i L_i (n_{g\_i\_TE} - n_{g\_i\_TM}) \right| \leq 5.0 \times 10^{-4} [m].$$

3. The optical waveguide element as set forth in claim 1, further comprising:
a joint section for connecting the i-th waveguide and an (i+1)th waveguide,
at a first boundary between the i-th waveguide and the joint section, the joint section having a first width that is equal to a width of the i-th waveguide,
at a second boundary between the joint section and the (i+1)th waveguide, the joint section having a second width that is equal to a width of the (i+1)th waveguide, and
the first width continuously changing from the first boundary to the second boundary such that the first width increases to the second width.

4. The optical waveguide element as set forth in claim 1, wherein:
the i-th waveguide is directly connected with an (i+1)th waveguide.

5. The optical waveguide element as set forth in claim 1, wherein:
the plurality of waveguides is two waveguides.

6. The optical waveguide element as set forth in claim 1, wherein:
the core has an entire length of not less than 1000 μm.

7. The optical waveguide element as set forth in claim 1, wherein:
the core has a thickness in a range of not less than 210 nm and not more than 230 nm.

8. The optical waveguide element as set forth in claim 1, wherein:
the core further includes a conversion section;
the conversion section has a light exit side end connected to a light incident side end of the plurality of waveguides that communicate with each other, the light incident side end of the plurality of waveguides serving as the light incidence plane of the core; and
the light incident side end of the conversion section has a width that is smaller than a width of the light incident side end of the plurality of waveguides.

9. A light-receiving device comprising:
an optical waveguide element as set forth in claim 1; and
a light-receiving element including a light-receiving section that is arranged so as to be opposed to a light exit plane of the core of the optical waveguide element.

10. An optical communication device comprising:
a light-receiving device as set forth in claim 9;
a laser diode for outputting an optical signal; and
an optical modulator for modulating the optical signal that is inputted from the laser diode.

11. The optical communication device as set forth in claim 10, further comprising:
an output IC for outputting, to an external device, an output signal in accordance with an electric signal that is inputted from the light-receiving device, the electric signal indicating the optical signal having been received by the light-receiving device; and
a control IC for controlling the laser diode and the optical modulator, in accordance with a control signal that is inputted from the external device.

12. An optical modulator comprising:
a core made of Si and including a Mach-Zehnder interferometer, the core having a first arm and a second arm; and
a cladding made of $SiO_2$,
the core including a waveguide set which produces a difference between the first arm and the second arm of the core, the waveguide including an optical waveguide element as set forth in claim 1.

13. An optical resonator comprising:
a first core that is a ring-shaped core made of Si;
a second core made of Si, the second core being coupled to the first core so as to resonate with the first core; and
a cladding made of $SiO_2$,
the first core including a core of an optical waveguide element as set forth in claim 1.

14. A method for producing an optical waveguide element including:
a core made of Si, the core including a plurality of waveguides having different widths, respectively, the plurality of waveguides communicating with each other along a light propagation direction; and
a cladding made of $SiO_2$,
the method comprising the step of:
setting a length $L_{\_i}[m]$ of an i-th waveguide, as counted from a light incidence plane of the core, such that the length $L_{\_i}[m]$ satisfies the following relation:

[Math. 5]

$$\left|\sum_i L_i(n_{g\_i\_TE} - n_{g\_i\_TM})\right| \le 1.5 \times 10^{-3}[m],$$

where $n_{g\_i\_TE}$ is a group refractive index of a TE0 polarized wave in the i-th waveguide, and $n_{g\_i\_TM}$ is a group refractive index of a TM0 polarized wave in the i-th waveguide.

* * * * *